(12) United States Patent
Murayama et al.

(10) Patent No.: US 8,157,066 B2
(45) Date of Patent: Apr. 17, 2012

(54) IMPACT ABSORBING MEMBER

(75) Inventors: Masaru Murayama, Komaki (JP); Junichiro Suzuki, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 944 days.

(21) Appl. No.: 12/216,986

(22) Filed: Jul. 14, 2008

(65) Prior Publication Data
US 2009/0026801 A1 Jan. 29, 2009

(30) Foreign Application Priority Data

Jul. 27, 2007 (JP) .................................. 2007-196324

(51) Int. Cl.
*B60R 19/02* (2006.01)
*F16F 7/12* (2006.01)

(52) U.S. Cl. ......... 188/371; 188/377; 293/154; 293/155

(58) Field of Classification Search .......... 188/371–377; 267/6, 140, 153; 293/120, 133, 122, 154; 296/187.03; 403/326, 329; 248/615
See application file for complete search history.

(56) References Cited

U.S. PATENT DOCUMENTS

| 6,042,163 | A  | * | 3/2000  | Reiffer .......................... | 293/155 |
|-----------|----|---|---------|------------------------------------|---------|
| 6,318,775 | B1 | * | 11/2001 | Heatherington et al. ..... | 293/120 |
| 6,695,368 | B1 | * | 2/2004  | Weykamp et al. ............ | 293/154 |
| 7,080,862 | B2 | * | 7/2006  | Suzuki et al. ................. | 293/154 |
| 7,354,030 | B2 | * | 4/2008  | Murayama et al. ........... | 267/140 |
| 7,559,589 | B2 | * | 7/2009  | Nees ............................. | 293/154 |
| 2004/0217606 | A1 | * | 11/2004 | Weykamp et al. ............ | 293/133 |
| 2005/0156443 | A1 | * | 7/2005  | Suzuki et al. ................. | 293/154 |
| 2007/0085252 | A1 | * | 4/2007  | Murayama et al. ........... | 267/152 |
| 2008/0122147 | A1 |   | 5/2008  | Murayama et al.           |         |

FOREIGN PATENT DOCUMENTS

| JP | A-10-35378    | 2/1998  |
| JP | A-2000-52897  | 2/2000  |
| JP | A-2001-10424  | 1/2001  |
| JP | A-2004-217107 | 8/2004  |
| JP | A-2006-62635  | 3/2006  |
| JP | A-2006-168535 | 6/2006  |
| JP | A-2007-118931 | 5/2007  |

* cited by examiner

*Primary Examiner* — Bradley King
*Assistant Examiner* — Thomas Irvin
(74) *Attorney, Agent, or Firm* — Oliff & Berridge, PLC

(57) ABSTRACT

An object of the present invention is to provide an impact absorbing member capable of reinforcing a desired reinforcement object portion. The impact absorbing member includes a long impact absorbing body which absorbs energy at the time of a collision by being deformed itself and a mounting member which is disposed at a reinforcement object portion of the impact absorbing body so that it is deformed along deformation of the reinforcement object portion at the time of the collision and mounted to a mounting object member. When the reinforcement object portion is deformed at the time of the collision, the mounting member is deformed along deformation of the reinforcement object portion. Due to that deformation, the mounting member can reinforce the reinforcement object portion.

4 Claims, 18 Drawing Sheets

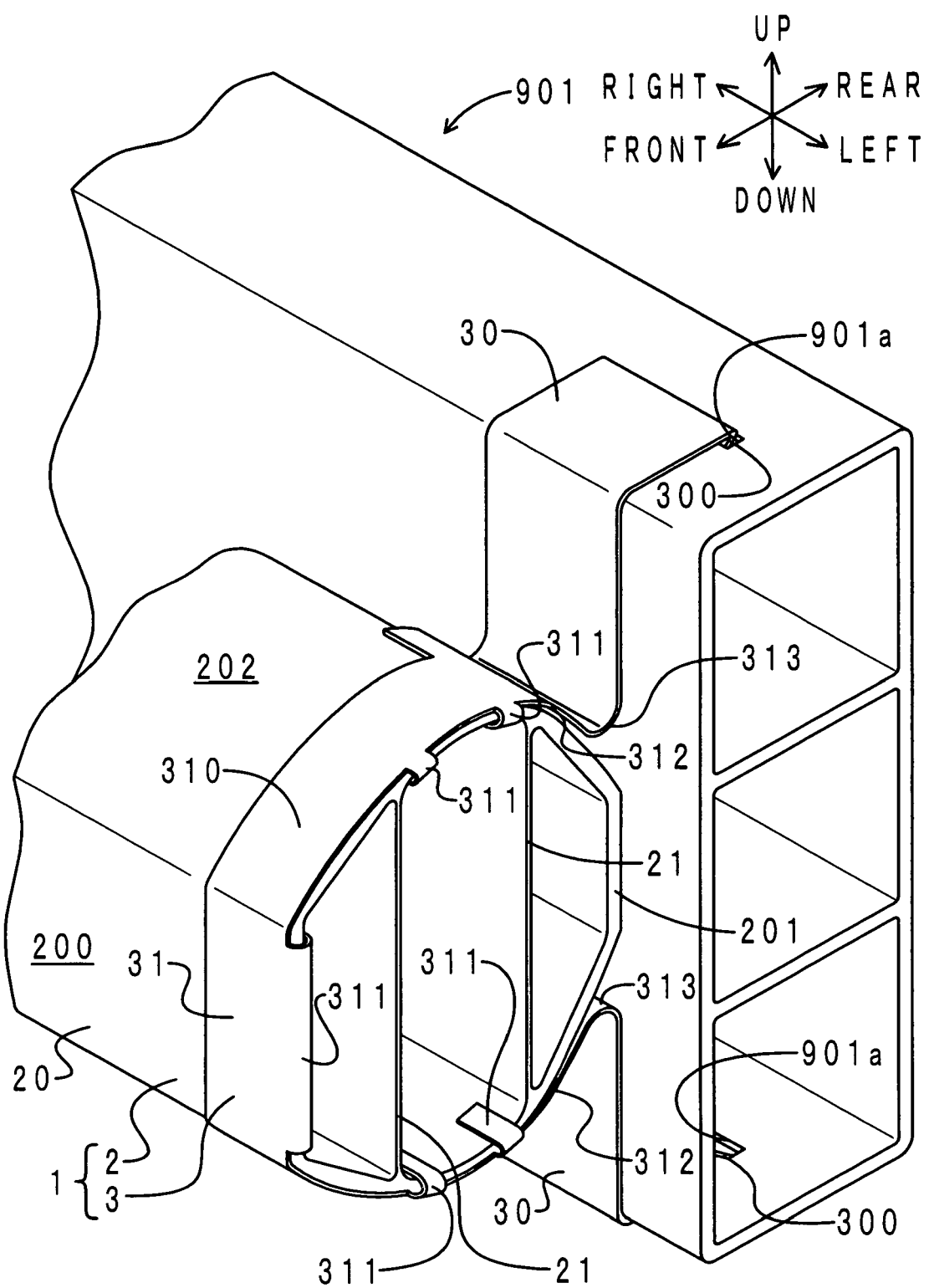
F I G. 2

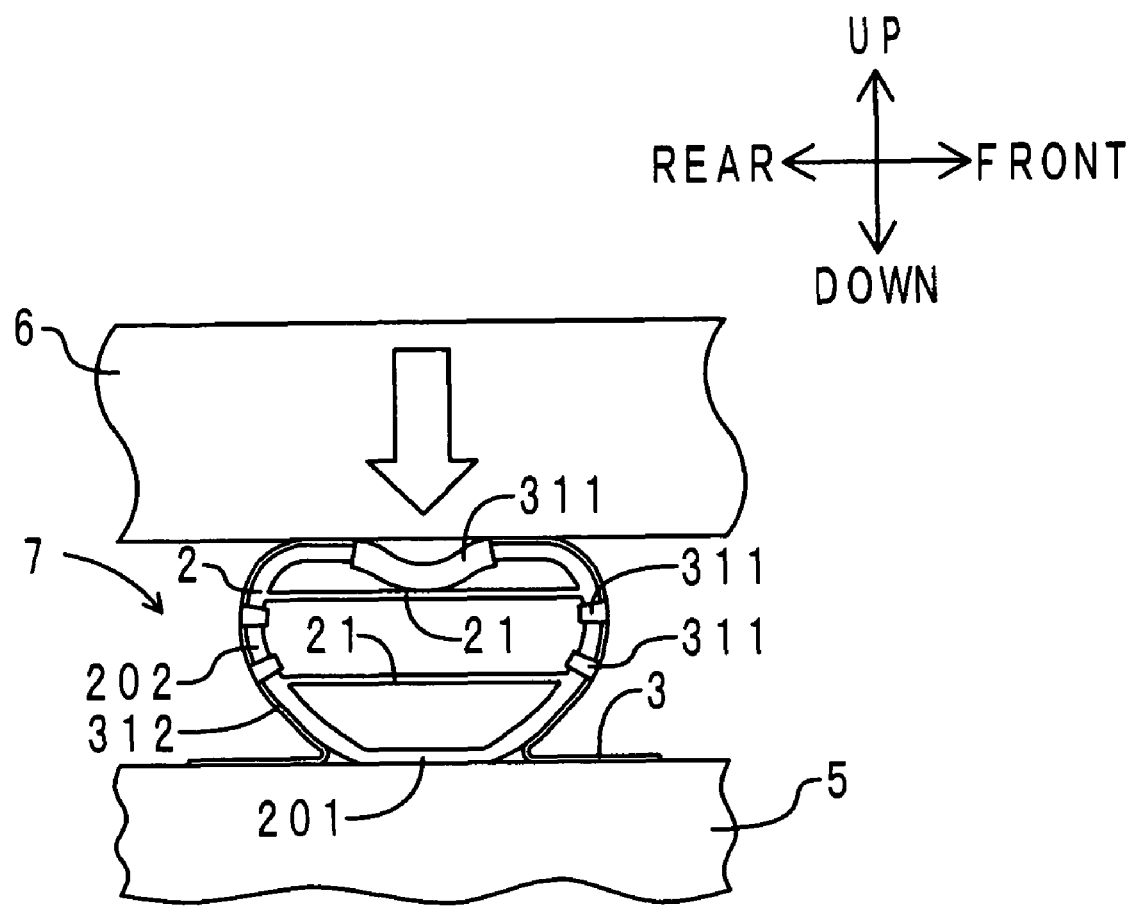
F I G. 14B

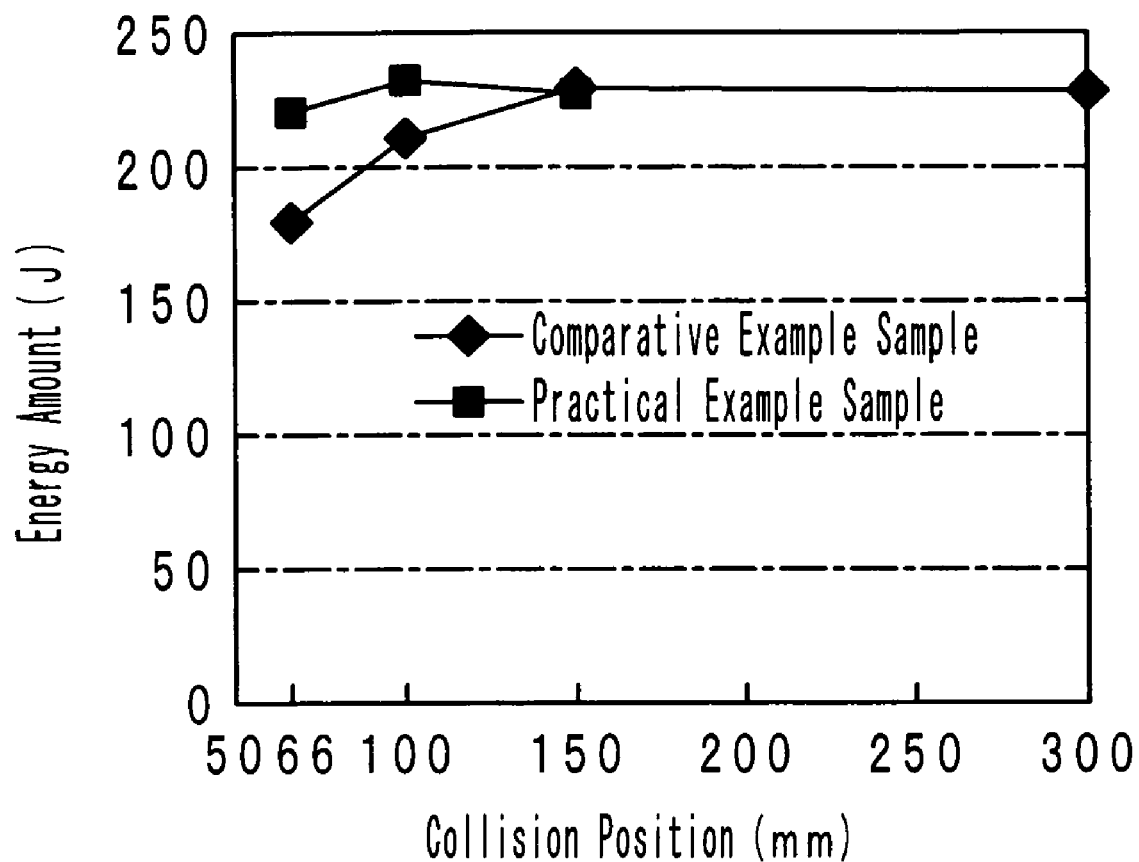
F I G. 16

# IMPACT ABSORBING MEMBER

INCORPORATION BY REFERENCE

The disclosure of Japanese Patent Application No. 2007-196324 filed on Jul. 27, 2007 including the specification, drawings and abstract is incorporated herein by reference in its entirety.

BACKGROUND OF THE INVENTION

1. Field of the Invention

The present invention relates to an impact absorbing member for protecting a passenger in a vehicle and a pedestrian by absorbing an impact at the time of a collision.

2. Description of the Related Art

For example, Japanese Unexamined Patent Application Publication No. 2006-62635 and Japanese Unexamined Patent Application Publication No. 2007-118931 have disclosed long impact absorbing members to be installed on a bumper beam or a roof side inner panel of a vehicle. The impact absorbing member absorbs energy at the time of a collision by being deformed itself. Thus, if any impact absorbing member is disposed on a bumper beam, it can mitigate an impact applied to a pedestrian (hereinafter, referred to as "pedestrian", which includes a rider of a bicycle or a motorcycle). If the impact absorbing member is disposed on a roof side inner panel, the impact applied to a passenger of vehicle at the time of a collision can be mitigated.

The sectional shapes in the direction of a short side of the long impact absorbing members described in Japanese Unexamined Patent Application Publication No. 2006-62635 and Japanese Unexamined Patent Application Publication No. 2007-118931 are identical throughout the entire length direction. However, distribution of a load of the impact absorbing member (speaking in detail, reaction force applied from an impact absorbing member to an impact applying object when the impact applying object collide with the impact absorbing member) described in these documents is not uniform throughout the entire length direction.

For example, a central portion in the length direction of the impact absorbing member is restrained by portions that are adjacent at both sides in the length direction of the central portion. Thus, the central portion in the direction of the impact absorbing member is hard to deform. Therefore, the load on the central portion in the length direction is large. Contrary to this, as for both end portions in the length direction of the impact absorbing member, an adjacent portion in the length direction exists on only one side. That is, for the left end portion of the impact absorbing member, the adjacent portion exists only on the right side and for the right end portion of the impact absorbing member, the adjacent portion exists only on the left side. Thus, the both end portions in the length direction of the impact absorbing member are easy to deform. Therefore, the load on the both end portions in the length direction of the impact absorbing member is small.

In the case of the long impact absorbing members described in Japanese Unexamined Patent Application Publication No. 2006-62635 and Japanese Unexamined Patent Application Publication No. 2007-118931, the load on the central portion in the length direction is large while the load on both end portions in the length direction are small. In other words, the both end portions in the length direction are brittle with respect to the central portion in the length direction. Therefore, the both end portions in the length direction need to be reinforced.

On the other hand, some type of the impact absorbing member have a mounting member for fixing the impact absorbing member firmly to a mounting object member such as a bumper beam. For example, the impact absorbing member mentioned in Japanese Unexamined Patent Application Publication No. 2006-168535 is fixed to the bumper beam by means of clips, screws or bands as described in paragraph [0012], FIG. 7 and FIG. 8 of the same document. However, in Japanese Unexamined Patent Application Publication No. 2006-168535, there is no description that implies that an impact absorbing member is reinforced by means of clips, screws or bands. If an impact absorbing member is fixed to the bumper beam with the clips or screws, insertion holes for allowing the clip or bolt to pass through need to be bored in the impact absorbing member. Consequently, the portion in which the insertion hole is bored becomes brittle.

SUMMARY OF THE INVENTION

The impact absorbing member of the present invention has been completed in view of the above-described problem and an object of the present invention is to provide an impact absorbing member capable of reinforcing a desired reinforcement object portion, for example, both end portions in the length direction.

(1) In order to achieve the above-mentioned object, the present invention provides an impact absorbing member comprising: a long impact absorbing body for absorbing energy at the time of a collision by being deformed itself; and a mounting member which is disposed on a reinforcement object portion of the impact absorbing body so that it is deformed along deformation of the reinforcement object portion at the time of a collision and mounted to a mounting object member.

The reinforcement object portion mentioned here refers to a portion whose load needs to be large of the impact absorbing body, for example, a portion in an impact absorbing body to which the load applied is relatively small compared with other portions. Further, it also refers to a portion whose load needs to be large because of a demand due to a fact that the load is likely to be concentrated at the time of a collision despite that load is not smaller than other portions.

The reinforcement object portion of the case where the impact absorbing member of the present invention is disposed on the bumper is exemplified below. For example, if a hole for mounting an eyebolt for traction is provided on the impact absorbing member, the surrounding portion of that hole is included in the reinforcement object portion.

For example when the impact absorbing member is curved along the shape of the bumper beam, if an included angle between the direction of vehicle width and an extension direction of an arbitrary portion of the impact absorbing member (speaking in detail, the direction of a tangent line of the curved face) is large, the load of a component in the collision direction might be insufficient. In this case, the portion having that a large included angle is included in the reinforcement object portion. More specifically, portions near both end portions of the curved impact absorbing member correspond to the reinforcement object portion.

Further, if the straight impact absorbing member is subjected to bending process along the shape of the curved bumper beam as a post treatment, sometimes a portion whose thickness is decreased can be generated accompanied by that bending treatment. In this case, the thin-walled portion is included in the reinforcement object portion.

The impact absorbing member of the present invention includes an impact absorbing body and a mounting member.

When the reinforcement object portion is deformed at the time of a collision, the mounting member is deformed along deformation of the reinforcement object portion. In other words, the mounting member is deformed following up deformation of the reinforcement object portion. Thus, the mounting member can be deformed sufficiently at the time of a collision. Due to that deformation, the mounting member can bear part of energy applied to the reinforcement object member at the time of the collision. That is, the mounting member can reinforce the reinforcement object portion.

The mounting member of the impact absorbing member of the present invention includes both a function of fixing the impact absorbing body to the mounting object member and a function of reinforcing the reinforcement object portion. Thus, as compared with a case where the reinforcement member is additionally disposed independently of the mounting member (for example as compared with a case where the reinforcement member is disposed on the impact absorbing member described in Japanese Unexamined Patent Application Publication No. 2006-168535), the quantity of components required is smaller.

As compared with a case where the impact absorbing member (the impact absorbing member of Japanese Unexamined Patent Application Publication No. 2006-168535 corresponds to the impact absorbing body of the present invention) is fixed to the mounting object member by means of the clips, screws or bands as described in Japanese Unexamined Patent Application Publication No. 2006-168535, no hole needs to be bored in the impact absorbing body. Consequently, the impact absorbing body must not be brittle. Additionally, a work for boring the holes in the impact absorbing body is not required.

(2) It is preferable that, in the impact absorbing member having the above-described structure (1), the reinforcement object portion is both end portions in the length direction of the impact absorbing body. In the impact absorbing member having this structure, the both end portions in the length direction of the impact absorbing body which is likely to become brittle can be reinforced. Further, if the both end portions in the length direction of the impact absorbing body are set at mounting positions with respect to the mounting object member, bending of the impact absorbing body after being installed, for example, bending due to its own weight, can be suppressed.

(3) It is preferable that, in the impact absorbing member having the above-mentioned structure (2), a pair of the mounting members are disposed on the both end portions in the length direction, and each of the pair of the mounting members includes a covering portion which covers from outside the end portion in the length direction and a pawl portion which is curved inward and extended from the covering portion so as to nip at least part of the end portion in the length direction together with the covering portion.

In the impact absorbing member having this structure, at least part of each of the both end portions in the length direction of the impact absorbing body is nipped by the covering portion from outside and by the pawl portion from inside, respectively. Thus, when at least one end portion in the length direction in the length direction of the impact absorbing body is deformed, the mounting member disposed at the end portion that is to be deformed is hard to be separated from that end portion in the length direction. Therefore, the impact absorbing body can be deformed more securely following up deformation of the end portion in the length direction of the impact absorbing body.

(4) It is preferable that, in the impact absorbing member having the above-mentioned structure (3), the impact absorbing body includes an outer cylinder and a plurality of inner ribs whose faces are developed substantially perpendicular to the direction of a load input at the time of a collision while connecting the inner faces of the outer cylinder and deformed by tension at the time of a collision.

In the impact absorbing body of the impact absorbing member having this structure, part of energy at the time of a collision is consumed when the inner ribs are deformed by tension. Thus, the load during the initial period of a collision is hard to increase rapidly. Therefore, any large load can be prevented from being applied to a collision object (for example, a passenger or pedestrian) during the initial period of a collision. Further, deformation of the inner rib by tension is executed continuously from the initial period of a collision to a termination period. Thus, a load raised at the initial period of the collision is not decreased easily. Therefore, energy at the time of collision can be absorbed effectively.

(5) It is preferable that, in the impact absorbing member having the above-mentioned structure (4), the outer cylinder includes an input wall portion to which a load is inputted, an output wall portion which outputs the load to the mounting object member while being disposed substantially in parallel to the input wall portion; and a pair of connecting wall portions for connecting the input wall portion with the output wall portion, wherein a pair of the inner ribs are disposed substantially in parallel to the input wall portion and the output wall portion while the pair of the inner ribs connect to the inner faces of the pair of the connecting wall portions, and the pawl portions nip at least both end portions in the circumferential direction of the input wall portion and both end portions in the circumferential direction of a section surrounded by the pair of the inner ribs of the connecting wall portion, together with the covering portion.

In the impact absorbing member having this structure, when at least one end portion in the length direction of both end portions in the length direction of the impact absorbing body is deformed due to a collision, the pawl portion is disposed at a portion in which the mounting member and the end portion in the length direction are easy to separate. Consequently, the mounting member is harder to separate from the end portion in the length direction. Thus, the mounting member can be deformed more securely following up deformation of the end portions in the length direction.

(6) It is preferable that, in the impact absorbing member having the above-mentioned structure (1), the mounting member has a wrap-around portion which covers at least part of a portion exposed on the mounting object member side of the reinforcement object portion.

In the impact absorbing member having this structure, the wrap-around portion of the mounting member covers at least part of a portion exposed on the mounting object member side (that is, an opposite side portion to an load input side) of the reinforcement object portion. At the time of a collision, the wrap-around portion is sandwiched between the reinforcement object portion and the mounting object member. Accordingly, the wrap-around portion can be deformed following up deformation of the portion exposed on the mounting object portion side of the reinforcement object portion.

As described above, the present invention can provide an impact absorbing member capable of reinforcing a desired reinforcement object portion.

BRIEF DESCRIPTION OF THE DRAWINGS

FIG. 2 is an enlarged perspective view of the vicinity of the left end portion of the same impact absorbing member;

FIG. 14B is a schematic diagram showing a condition of collision intermediate period when the mounting member of the practical example sample is hit against a striker;

FIG. 16 is a graph showing the relation between a collision position and energy amount of the samples of the practical example and the comparative example.

DETAILED DESCRIPTION OF THE PREFERRED EMBODIMENTS

Hereinafter, the embodiment of the impact absorbing member of the present invention will be described.

First Embodiment

[Arrangement of Impact Absorbing Member]

Figure 1:
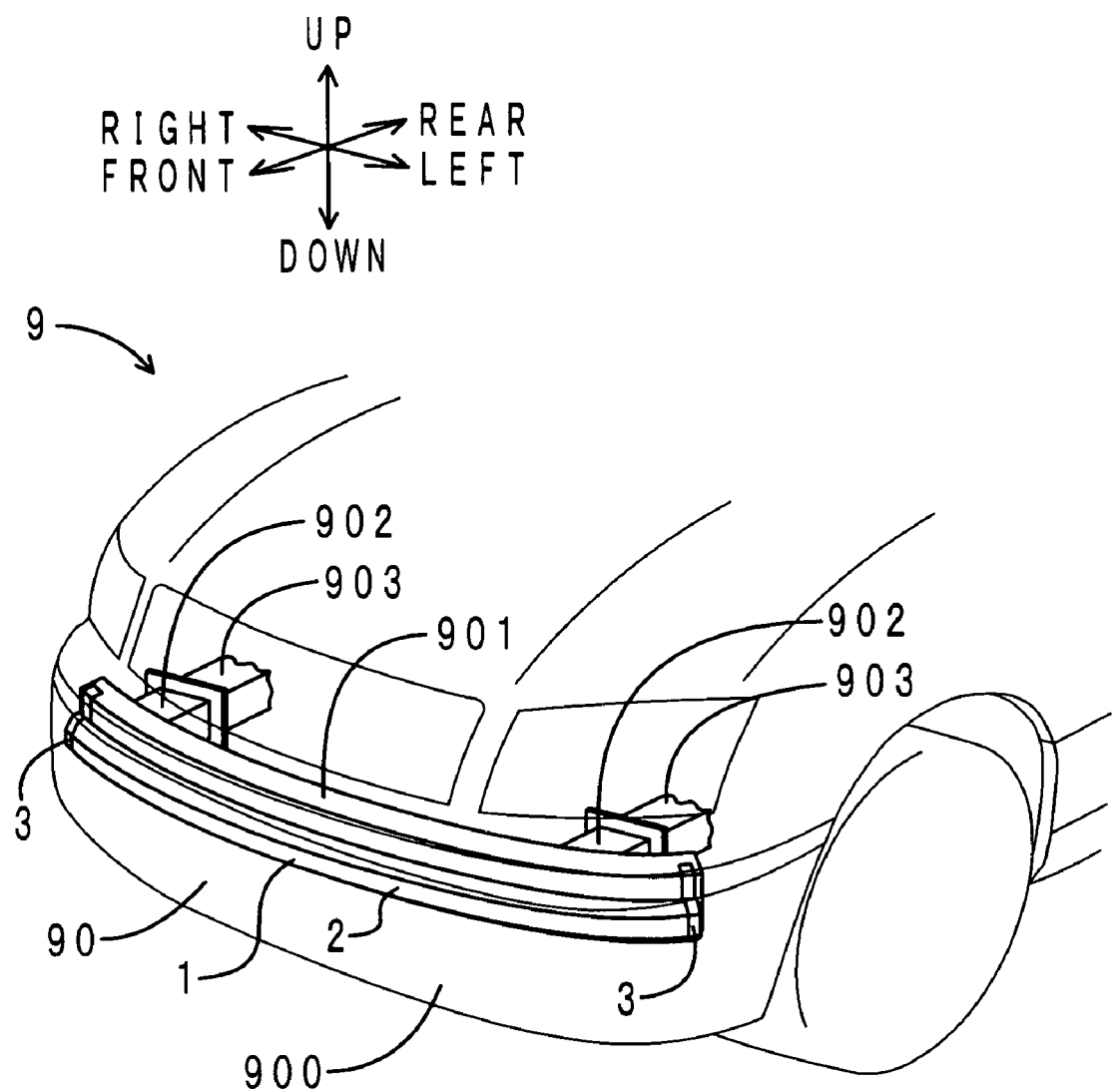
FIG. 1 is a transparent perspective view of the vicinity of a front bumper of a vehicle in which the impact absorbing member of the first embodiment is disposed.

First, the arrangement of the impact absorbing member of this embodiment will be described. FIG. 1 shows a transparent perspective view of the vicinity of the front bumper of a vehicle in which the impact absorbing member of this embodiment is disposed. In the meantime, in FIG. 1-FIG. 10, the directions (right/left) are defined as a vehicle as viewed from its rear to the front.

As shown in FIG. 1, a front bumper 90 of a vehicle 9 includes a bumper fascia 900, a bumper beam 901 and a crush box 902. The impact absorbing member 1 is disposed in front of the bumper beam 901. In the meantime, the bumper beam 901 is included in the abutting member of the present invention.

The bumper beam 901 is made of aluminum alloy. The bumper beam 901 is of a long quadrangular pipe. The bumper beam 901 is extended in the vehicle width direction (right and left direction).

The crush box 902 is made of aluminum alloy. The crush box 902 is of a box shape which is open rearward. Two crush boxes 902 are disposed apart from each other in the vehicle width direction. A pair of the crush boxes 902 are fixed to the front ends of front side members 903 in such a state that their openings are closed. Right and left end portions of the bumper beam 901 are fixed to the front wall of the pair of the crush boxes 902.

The bumper fascia 900 is made of olefin resin. The bumper fascia 900 is of a long shape. The bumper fascia 900 is extended in the vehicle width direction. The bumper fascia 900 covers the bumper beam 901 and the impact absorbing member 1 from the front.

[Structure of Impact Absorbing Member]

Figure 3:
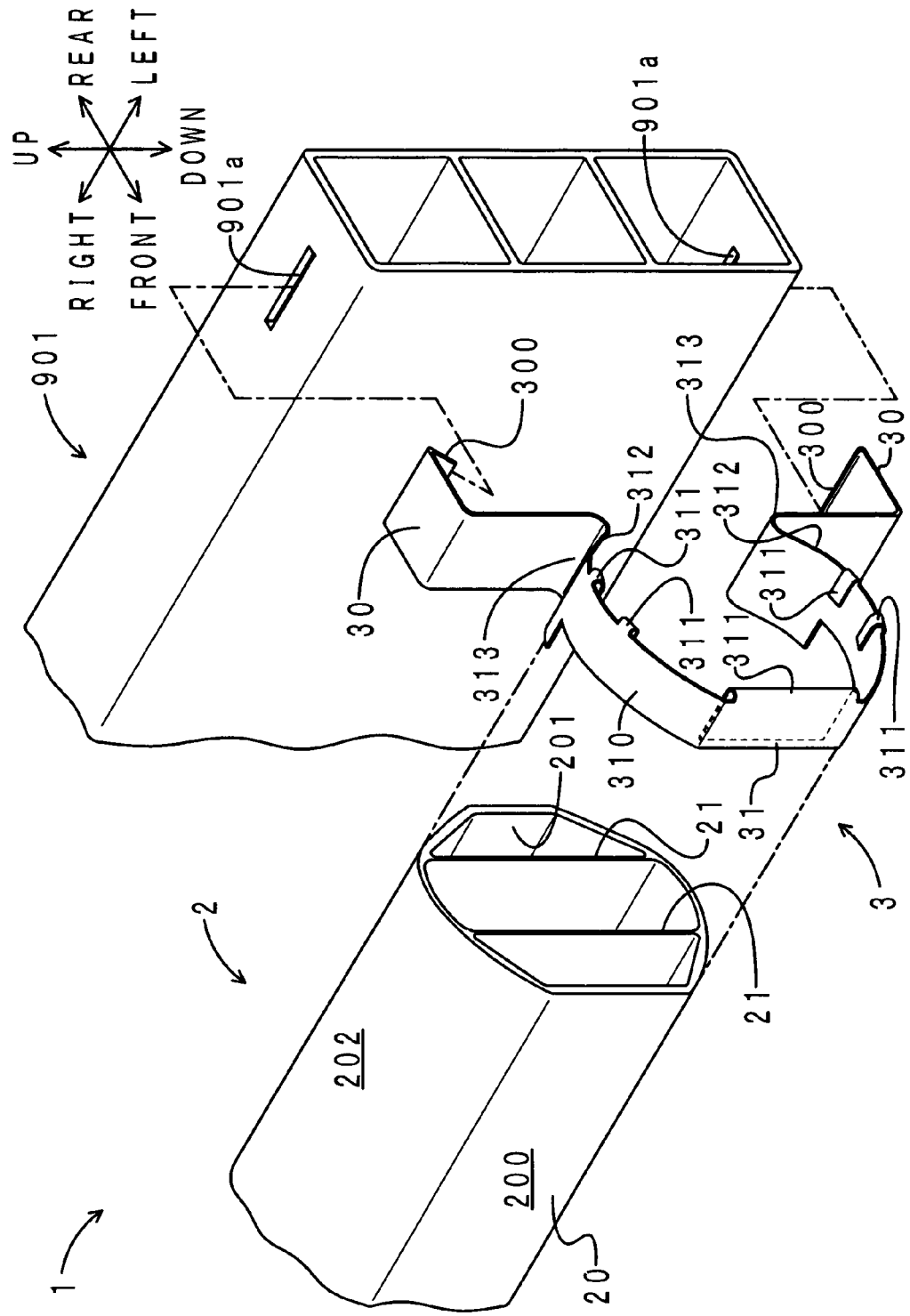
FIG. 3 is an enlarged exploded perspective view of the vicinity of the left end portion.
Figure 4:
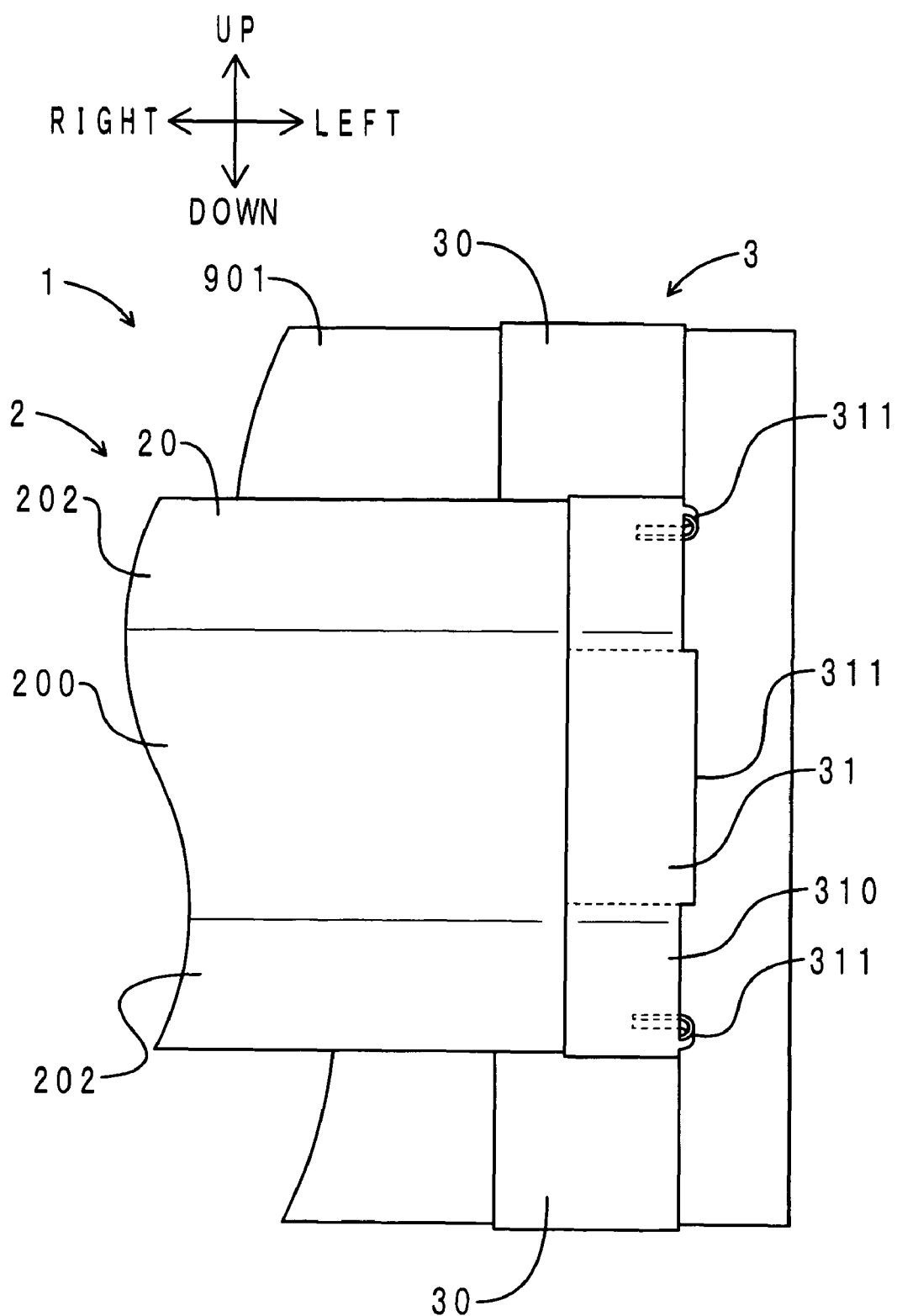
FIG. 4 is a front view of the vicinity of the left end portion.
Figure 5:
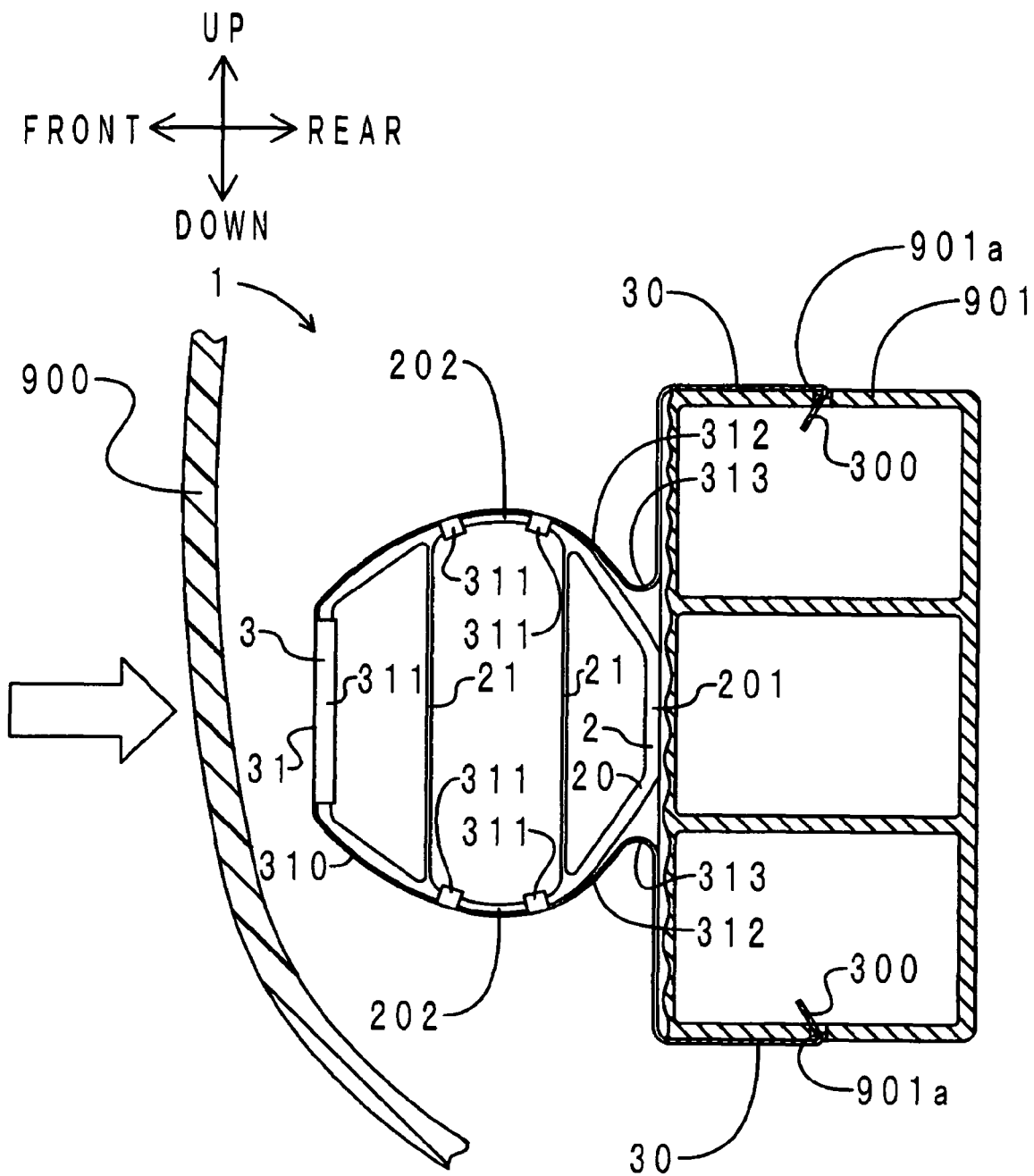
FIG. 5 is a partial sectional view of the vicinity of the left end portion as seen from the left side.

Next, the structure of the impact absorbing member 1 of this embodiment will be described. FIG. 2 shows an enlarged perspective view of the vicinity of a left end portion of the impact absorbing member 1 of this embodiment. FIG. 3 shows an enlarged disassembly perspective view of the vicinity of the left end portion thereof. FIG. 4 shows a front view of the vicinity of the left end portion thereof. FIG. 5 shows a partial sectional view of the vicinity of the left end portion thereof as seen from the left side. As shown in FIG. 2-FIG. 5, the impact absorbing member 1 of this embodiment includes an impact absorbing body 2 and a mounting member 3.

The impact absorbing body 2 is extended in the right and left direction along the front face of the bumper beam 901 (see FIG. 1). The impact absorbing body 2 is made of resin. More specifically, the impact absorbing body 2 is a marketed product called "UBE Nylon 6" (manufactured by UBE INDUSTRIES, LTD., product number "1013IU50"). The impact absorbing body 2 is manufactured by extrusion molding. The impact absorbing body 2 is manufactured in a following manufacturing method. First, the extruded material formed integrally using the product "UBE Nylon 6" is cut to a specified dimension. Next, after cutting, the extruded material is processed to be formed into a predetermined curved shape. In this way, the impact absorbing body 2 is manufactured. The impact absorbing body 2 includes an outer cylinder 20 and a pair of front and rear inner ribs 21.

The outer cylinder 20 is of a substantially octagonal pipe shape. The outer cylinder 20 is comprised of an input wall portion 200, an output wall portion 201 and a pair of connecting wall portions 202. The input wall portion 200 is of a flat plate shape and disposed on the front edge of the outer cylinder 20. The output wall portion 201 is of flat plate and disposed on the rear edge of the outer cylinder 20. The output wall portion 201 is disposed substantially in parallel to the input wall portion 200. Of the pair of the connecting wall portions 202, the upper connecting wall portion 202 is of an arc plate shape which is expanded upward and connects the top edge of the input wall portion 200 with the top edge of the output wall portion 201. Of the pair of the connecting wall portions 202, the lower connecting wall portion 202 is of arc plate which is expanded downward and connects the bottom edge of the input wall portion 200 and the bottom edge of the output wall portion 201.

A pair of the inner ribs 21 are of a plate shape which is extended in the right and left direction. The pair of the inner ribs 21 are disposed inside the outer cylinder 20. The pair of the inner ribs 21 connect the inner faces of the pair of the connecting wall portions 202. The pair of the inner ribs 21 are disposed substantially in parallel to the input wall portion 200 and the output wall portion 201.

A pair of mounting members 3 are disposed on right and left end portions of the impact absorbing body 2 (see FIG. 1). The structure, assembling method, installation method and movement of the pair of the mounting members, right and left, are the same. Therefore, only the left mounting member 3 will be described and description of the right mounting member 3 is omitted.

The mounting member 3 is manufactured by pressing a single steel plate. The mounting member 3 has a pair of base portions 30, upper and lower and a projecting portion 31.

Of the pair of the base portions 30, an upper base portion 30 covers a section from the top front portion to the front top portion of the bumper beam 901. A mounting pawl 300 is disposed at an end portion of the base portion 30. The mounting pawl 300 is formed by bending the end portion of the base portion 30 downwardly to the front. On the other hand, a mounting object hole 901a is bored in the top wall of the bumper beam 901. The mounting pawl 300 is engaged with the mounting object hole 901a. Of the pair of the base portions 30, a lower base portion 30 covers a section from the bottom front portion to the front bottom portion of the bumper beam 901. The mounting pawl 300 is disposed at an end portion of the base portion 30. The mounting pawl 300 is formed by bending the end portion of the base portion 30 upwardly to the front. On the other hand, the mounting object hole 901a is bored in the bottom wall of the bumper beam 901. The mounting pawl 300 is engaged with the mounting object hole 901a. By engaging the pair of the upper and lower mounting pawls 300 with the pair of the upper and lower mounting object holes 901a, the mounting member 3, that is, the impact absorbing member 1 is mounted to the bumper beam 901.

A projecting portion 31 is disposed between the pair of the upper and lower base portions 30. The projecting portion 31 is projected forward with respect to the base portion 30. The projecting portion 31 includes a covering portion 310, a pawl portion 311, a wrap-around portion 312 and a chamfered portion 313. The left end portion of the impact absorbing body 2 is accommodated between the inside of the projecting portion 31 and the front face of the bumper beam 901.

The covering portion 310 covers the left end portion of the impact absorbing body 2. The covering portion 310 is of a substantially octagonal ring shape having no rear edge, whose inner face runs along the outer periphery of the outer cylinder 20.

A pair of the pawl portions 311 are disposed on the top edge and bottom edge each and one pawl portion 311 is disposed on the front edge. That is, totally five pawl portions 311 are disposed. The respective pawl portions 311 are extended such that they are curved inwardly in a U-shape from the left edge of the covering portion 310. Of the five pawl portions 311, the pair of the pawl portions 311 on the top edge nip both end portions in a back and forth direction of a section surrounded by a pair of the inner ribs 21 of the upper connecting wall portion 202 together with the covering portion 310. Of the five pawl portions 311, the pair of the pawl portions 311 on the bottom edge nip both end portions in the back and forth direction of a section surrounded by a pair of the inner ribs 21 of the lower connecting wall portion 202 together with the covering portion 310. Of the five pawl portions 311, the pawl portion 311 of the front edge nips the entire input wall portion 200 together with the covering portion 310.

The wrap-around portion 312 covers a portion that is exposed on the front side of the bumper beam 901 of the left end portion of the impact absorbing body 2. The wrap-around portion 312 is disposed at a portion of the projecting portion 31 in which the pawl portions 311 are not disposed. A pair of the wrap-around portions 312 are disposed at upper and lower positions. The right and left length of the wrap-around portion 312 and the chamfered portion 313 are set larger than the right and left length of the portion of the projecting portion 31 in which the pawl portions 311 are disposed (see FIG. 3).

The chamfered portion 313 is of a curved plate shape. The chamfered portion 313 is curved in an opposite direction to the curved direction of the entire projecting portion 31 at a predetermined curvature. A pair of the chamfered portions 313 are disposed at upper and lower positions. Of the pair of the chamfered portions 313, upper and lower, the upper chamfered portion 313 connects the upper wrap-around portion 312 with the bottom edge of the upper base portion 30. Likewise, the lower chamfered portion 313 connects the lower wrap-around portion 312 with the top edge of the lower base portion 30.

[Assembling Method of Impact Absorbing Member]

Next, the assembling method of the impact absorbing member 1 of this embodiment will be described. In assembling, the left end portion of the impact absorbing body 2 is inserted relatively into the inside of the projecting portion 31 of the mounting member 3. At this time, the input wall portion 200 of the impact absorbing body 2 is inserted relatively in between the front edge of the covering portion 310 and the front pawl portion 311. Additionally, the upper connecting wall portion 202 of the impact absorbing body 2 is inserted relatively in between the top edge of the covering portion 310 and the pair of the upper pawl portions 311. Further, the lower connecting wall portion 202 of the impact absorbing body 2 is inserted relatively in between the bottom edge of the covering portion 310 and the pair of the lower pawl portions 311. In this way, the impact absorbing member 1 of this embodiment is assembled.

[Installation Method of Impact Absorbing Member]

Next, the installation method of the impact absorbing member 1 of this embodiment onto the bumper beam 901 will be described. In installation, the impact absorbing member 1 is disposed in front of the left end portion of the bumper beam 901. At this time, the pair of the upper and lower mounting pawls 300 of the mounting member 3 are positioned so that they come in front to each of the pair of the upper and lower mounting object holes 901a in the bumper beam 901.

Next, the bumper beam 901 is inserted relatively in between the pair of the upper and lower base portions 30 of the mounting member 3. Here, an interval between the pair of the mounting pawls 300 is set slightly smaller than the width in the vertical width of the bumper beam 901. Thus, in insertion, the projecting portion 31 is deformed elastically so that its rear side is opened. In a process of insertion, the upper mounting pawl 300 slides relatively on the top face of the bumper beam 901 while the lower mounting pawl 300 slides on the bottom face of the bumper beam 901. Then, due to restoration force of the projecting portion 31 deformed elastically, the upper mounting pawl 300 is inserted into the upper mounting object hole 901a while the lower mounting pawl 300 is inserted into the lower mounting object hole 901a, respectively. In this way, the impact absorbing member 1 of this embodiment is installed onto the bumper beam 901.

[Movement of Impact Absorbing Member]

Next, the movement of the impact absorbing member 1 of this embodiment when a pedestrian collides with a vehicle 9 will be described. When a pedestrian collides with the left end of the bumper fascia 900 of the vehicle 9, a load is inputted from the front to the rear as indicated with a blank arrow in FIG. 5. The inputted load is transmitted to the impact absorbing body 2 through the bumper fascia 900. The mounting member 3 and the impact absorbing body 2 are deformed such that they are crushed in the back and forth directions between the bumper fascia 900 and the bumper beam 901. At this time, the outer cylinder 20 of the impact absorbing body 2 is deformed so that it is expanded vertically. Thus, the inner ribs 21 are applied a tension from up and down directions. The inner ribs 21 are pulled and deformed by that tension. Further, the mounting member 3 and the impact absorbing body 2 are joined firmly by means of the five pawl portions 311. Thus, the mounting member 3 is not separated from the impact absorbing body 2 easily. Thus, the mounting member 3 is deformed plastically along the deformation of the impact absorbing body 2. In this way, the impact absorbing member 1 of this embodiment absorbs an impact at the time of collision. In the meantime, a process of deformation of the impact absorbing member of the present invention at the time of collision will be described in detail through embodiments described later.

[Operation and Effect]

Next, the operation and effect of the impact absorbing member 1 of this embodiment will be described. In the impact absorbing member 1 of this embodiment, the input wall portion 200 of the impact absorbing body 2 is nipped by the covering portion 310 from the front side (outside) and the pawl portion 311 from rear side (inside). At the same time, the upper connecting wall portion 202 of the impact absorbing body 2 is nipped by the covering portion 310 from upside (outside) and a pair of the pawl portions 311 from downside (inside). Further, the lower connecting wall portion 202 of the impact absorbing body 2 is nipped by the covering portion 310 from downside (outside) and a pair of the pawl portions 311 from upside (inside). Thus, when the left end portion or right end portion of the impact absorbing body 2 is deformed, the mounting member 3 is not separated from the left end portion or the right end portion easily. That is, the mounting member 3 is deformed along deformation of the left end portion or the right end portion of the impact absorbing body 2. In other words, the mounting member 3 is deformed following up deformation of the left end portion or the right end portion of the impact absorbing body 2. Thus, the mounting member 3 can be deformed sufficiently at the time of collision. By this deformation, the mounting member 3 can bear part of energy applied to the left end portion or the right end portion of the impact absorbing body 2. That is, the mounting member 3 can reinforce both the right and left end portions of the impact absorbing body 2.

The mounting member 3 has functions of fixing the impact absorbing body 2 to the bumper beam 901 and reinforcing both the right and left end portions of the impact absorbing body 2. Thus, as compared with a case where any reinforcement member is disposed on the impact absorbing member 1 independently of the mounting member 3, the quantity of components required is smaller.

Further, the impact absorbing member 1 of this embodiment can reinforce both the right and left end portions of the impact absorbing body 2 which are likely to be brittle. In the impact absorbing member 1 of this embodiment, both the right and left end portions of the impact absorbing body 2 are set at a mounting position thereof to the bumper beam 901. Consequently, the impact absorbing body 2 can be prevented from being curved due to its own weight after being installed.

In the impact absorbing member 1 of this embodiment, when the inner ribs 21 are deformed by tension, part of energy at the time of collision is consumed. Thus, the load at the initial period of the collision cannot be increased rapidly. Thus, application of a large load on any collision object (for example, a passenger or a pedestrian) at the initial period of the collision can be suppressed. Further, the tensile deformation of the inner ribs 21 occurs continuously from the initial period of the collision up to the termination period. Thus, the load which is raised at the initial period of the collision does not drop easily. Thus, the energy at the time of collision can be absorbed effectively.

In the impact absorbing member 1 of this embodiment, the wrap-around portion 312 of the mounting member 3 covers a portion that is exposed on the bumper beam 901 side (that is, a rear portion thereof) on the left end portion and the right end portion of the impact absorbing body 2. Due to a load at the time of collision, the wrap-around portion 312 is sandwiched between the left end portion or the right end portion and the bumper beam 901. Thus, the wrap-around portion 312 can be deformed following up deformation of the part exposed on the bumper beam 901 side on the left end portion or the right end portion of the impact absorbing body 2.

According to the impact absorbing member 1 of this embodiment, the assembling work is completed only by inserting both the right and let end portions of the impact absorbing body 2 into the inside of the projecting portion 31 of the mounting member 3. Thus, the assembling is easy.

In the impact absorbing member 1 of this embodiment, the impact absorbing member 1 can be installed relatively onto the bumper beam 901 only by inserting the bumper beam 901 into the inside of the projecting portion 31 of the mounting member 3. Thus, the installation thereof is easy. The mounting pawl 300 is curved into a V-shape forwardly like a fish hook. Thus, the mounting pawl 300 does not slip out of the mounting object hole 901a easily. That is, the installation strength is high.

According to the impact absorbing member 1 of this embodiment, the impact absorbing body 2 is made of "UBE Nylon 6". The "UBE Nylon 6" is preferable as the material of the impact absorbing body 2 because its flexural modulus is 1 GPa or higher, tensile fracture elongation is 100% or more, and tensile yield stress is 15 MPa or more. The impact absorbing body 2 is manufactured by extrusion molding. Extrusion molding is particularly preferable as a forming method for the impact absorbing body 2 because it is effective for manufacturing products of a long shape.

Second Embodiment

The impact absorbing member of this embodiment is different from the impact absorbing member of the first embodiment in that the impact absorbing member is disposed on the roof side rail portion, not on the bumper beam. Further, the second embodiment is different from the first embodiment in that the mounting member is installed on the roof side rail portion by means of a clip, not by pawl engagement. Therefore, only different points will be described here.

Figure 6:
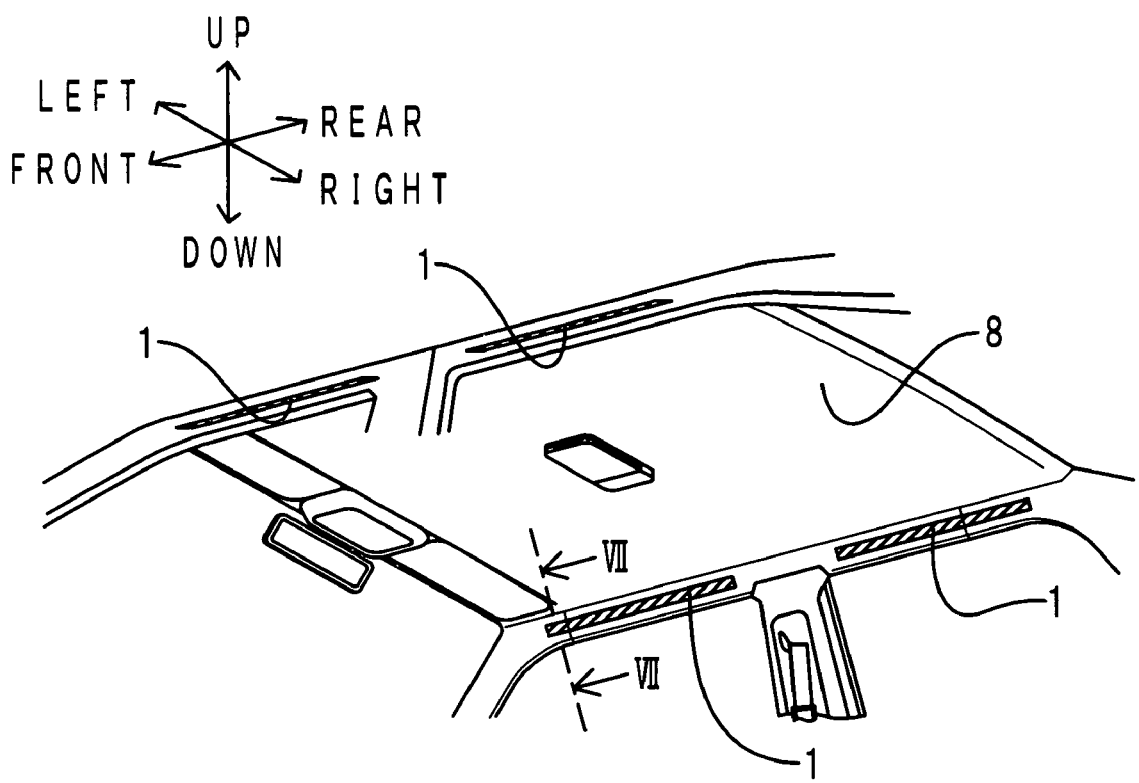
FIG. 6 is a perspective view of the interior of the vehicle compartment in which the impact absorbing member of the second embodiment is disposed.

FIG. 6 shows a perspective view of the interior of a vehicle compartment in which the impact absorbing member of this embodiment is disposed. Note that components corresponding to those in FIG. 1 are denoted by the same reference symbols. As shown in FIG. 6, a roof lining 8 made of resin is disposed on the ceiling of a vehicle compartment. Two columns of the impact absorbing members 1 (expressed by hatching in FIG. 6) are accommodated on each of right and left edges of the interior of the roof lining 8 such that they run in the back and forth direction. That is, totally four columns of the impact absorbing members 1 are disposed inside the roof lining 8.

Hereinafter, the arrangement and structure of the impact absorbing member 1 located on the front right of the inside of the roof lining 8 will be described. The arrangement and structure of the impact absorbing members 1 of remaining three columns are the same as the impact absorbing member 1 disposed on the front right. Therefore, description thereof is omitted.

Figure 7:
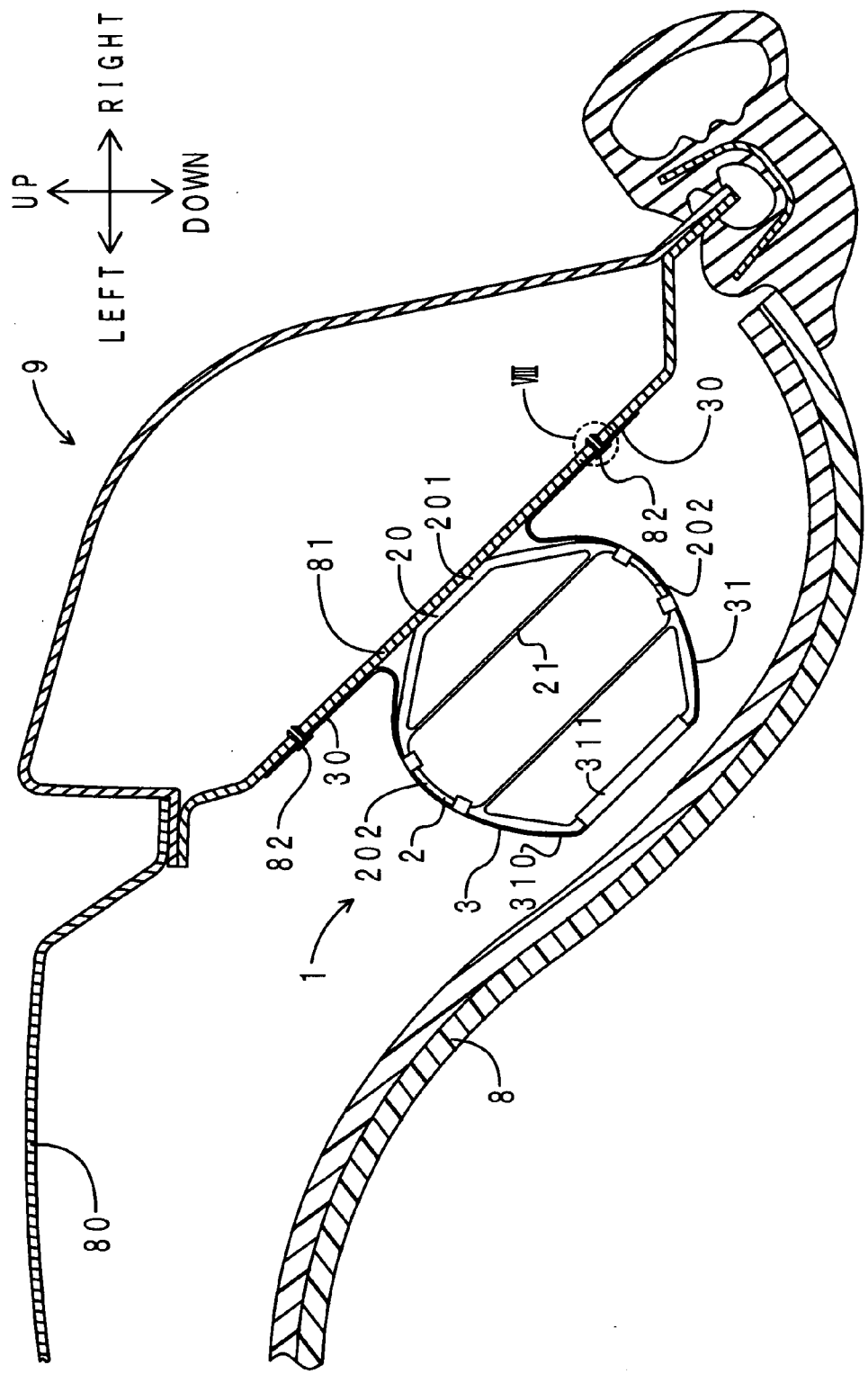
FIG. 7 is a sectional view taken along line VII-VII in FIG. 6.

FIG. 7 shows a sectional view taken along line VII-VII in FIG. 6. Note that components corresponding to those in FIG. 5 are denoted by the same reference symbols. As shown in FIG. 7, a loop panel 80 made of steel is disposed apart at a predetermined distance above the roof lining 8. The loop panel 80 forms the contour of the vehicle 9. A highly rigid roof side rail portion 81 made of steel is interposed between the roof lining 8 and the roof panel 80. The roof side rail 81 is included in the mounting object member of the present invention. The impact absorbing member 1 is fixed to the bottom face of the roof side rail portion 81. A pair of the mounting members 3 are disposed on both the back and forth end portions in of the impact absorbing body 2. FIG. 7 shows the mounting member 3 at the front end portion of the impact absorbing body 2. The mounting member at the rear end portion of the impact absorbing body 2 has the same structure. Therefore, only the mounting member 3 at the front end portion will be described and description of the mounting member at the rear end portion is omitted.

Figure 8:
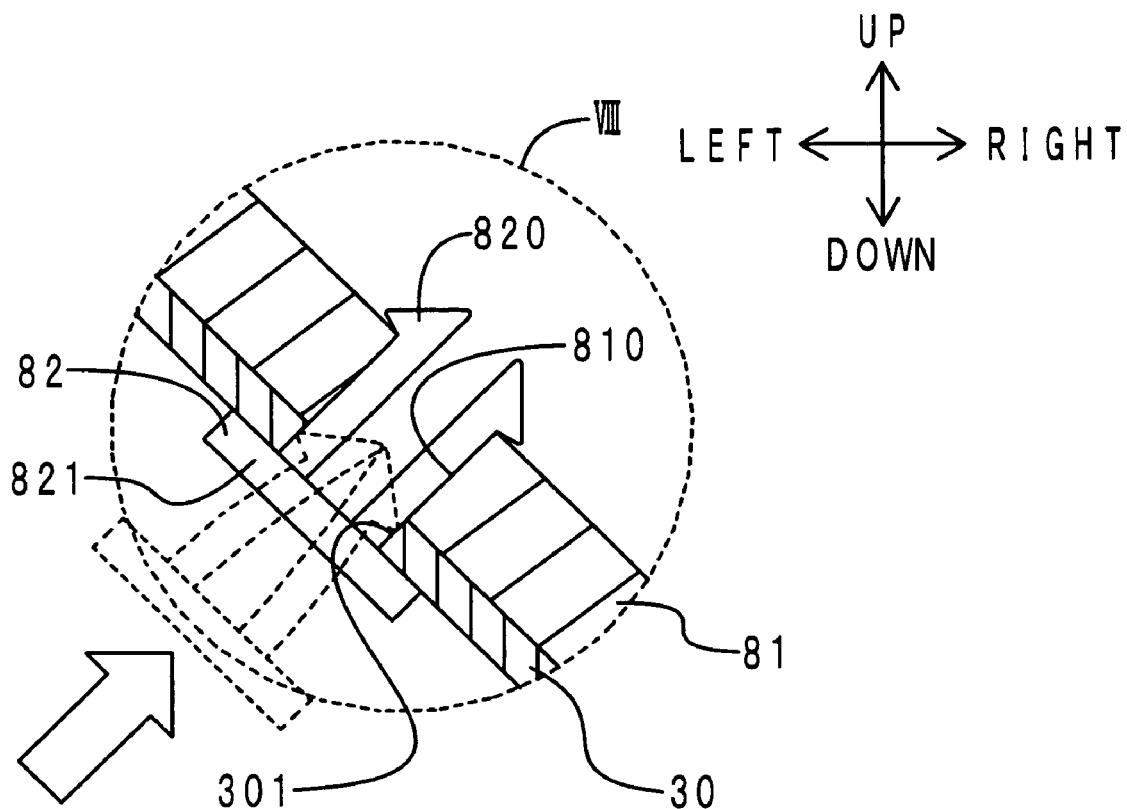
FIG. 8 is an enlarged view of a section within a circle VIII in FIG. 7.

FIG. 8 shows an enlarged diagram of a section within a circle VIII of FIG. 7. A base portion side through hole 301 is bored in each of the pair of the base portions 30 of the mounting member 3 of the impact absorbing member 1. Additionally, a pair of rail portion side through holes 810 are bored in the roof side rail portion 81. A clip 82 is passed through the base portion through hole 301 and the rail portion side through hole 810 in this order. When the clip 82 passes through the base portion side through hole 301 and the rail portion side through hole 810, as shown with a dotted line in FIG. 8, engaging pawls 820 of the clip 82 are deformed elastically inward. After the clip 82 passes through the base portion side through hole 301 and the rail portion side through hole 810, the engaging pawls 820 act to restore outwardly by the elastic restoration force. After the engaging pawls 820 have been restored, the base portion 30 and the roof side rail portion 81 are nipped between an apex wall 821 of the clip 82 and the front end of the engaging pawl 820. Consequently, the impact absorbing member 1 of this embodiment is installed onto the roof side rail portion 81 with the clips 82.

The impact absorbing member 1 of this embodiment has the same operation and effect as the impact absorbing member of the first embodiment in terms of the portions having a common structure. The impact absorbing member 1 of this embodiment is mounted onto the roof side rail portion 81 with the clips 82. Thus, the shape of the base portion 30 of the mounting member 3 is simpler than the impact absorbing member of the first embodiment. Therefore, processing of the mounting member 3 is simple. The impact absorbing member 1 of this embodiment can absorb an impact applied to the head of a passenger at the time of a collision.

Third Embodiment

The impact absorbing member of this embodiment is different from the impact absorbing member of the first embodiment in that the mounting member is installed to the bumper beam by means of bolts, not by pawl engagement. Therefore, only different points will be described here.

Figure 9:
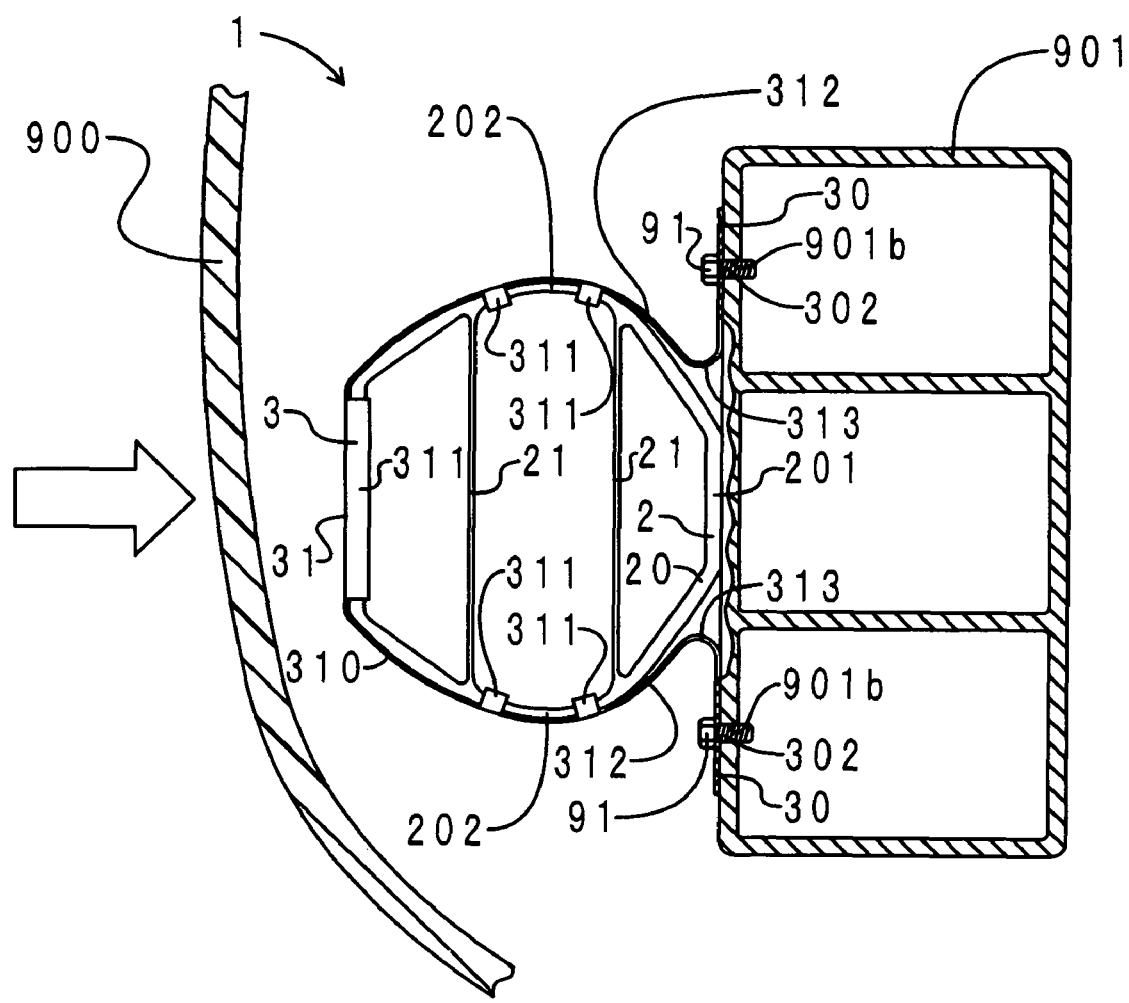
FIG. 9 is a partial sectional view of the vicinity of the left end portion of the impact absorbing member of the third embodiment as viewed from the left side.

FIG. 9 shows a partial sectional view of the impact absorbing member of this embodiment as viewed from the left side in the vicinity of the left end portion of the impact absorbing member of this embodiment. Note that components corresponding to those in FIG. 5 are denoted by the same reference symbols. A pair of the mounting members 3 are disposed on both right and left end portions of the impact absorbing body 2. FIG. 9 shows the mounting member 3 at the left end portion of the impact absorbing body 2. The mounting member at the right end portion of the impact absorbing body 2 has the same structure. Therefore, only the mounting member 3 at the left end portion will be described here and description of the mounting member at the right end portion is omitted.

A bolt through hole 302 is bored in each of the pair of the base portions 30 of the mounting member 3 of the impact absorbing member 1. A pair of bolt threaded holes 901b are bored in the bumper beam 901. A bolt 91 is passed through the bolt insertion hole 302 and screwed into the bolt threaded hole 901b. In this way, the impact absorbing member 1 of this embodiment is installed onto the bumper beam 901 by the bolts 91.

The impact absorbing member 1 of this embodiment has the same operation and effect as the impact absorbing member of the first embodiment in portions having a common structure. The impact absorbing member 1 of this embodiment is installed onto the bumper beam 901 by means of the bolts 91. Thus, the shape of the base portion 30 of the mounting member 3 is simpler than the impact absorbing member of the first embodiment. Thus, processing of the mounting portion 3 is simple. Further, according to the impact absorbing member 1 of this embodiment, the impact absorbing member 1 can be installed to the bumper beam 901 more firmly.

Fourth Embodiment

Figure 10:
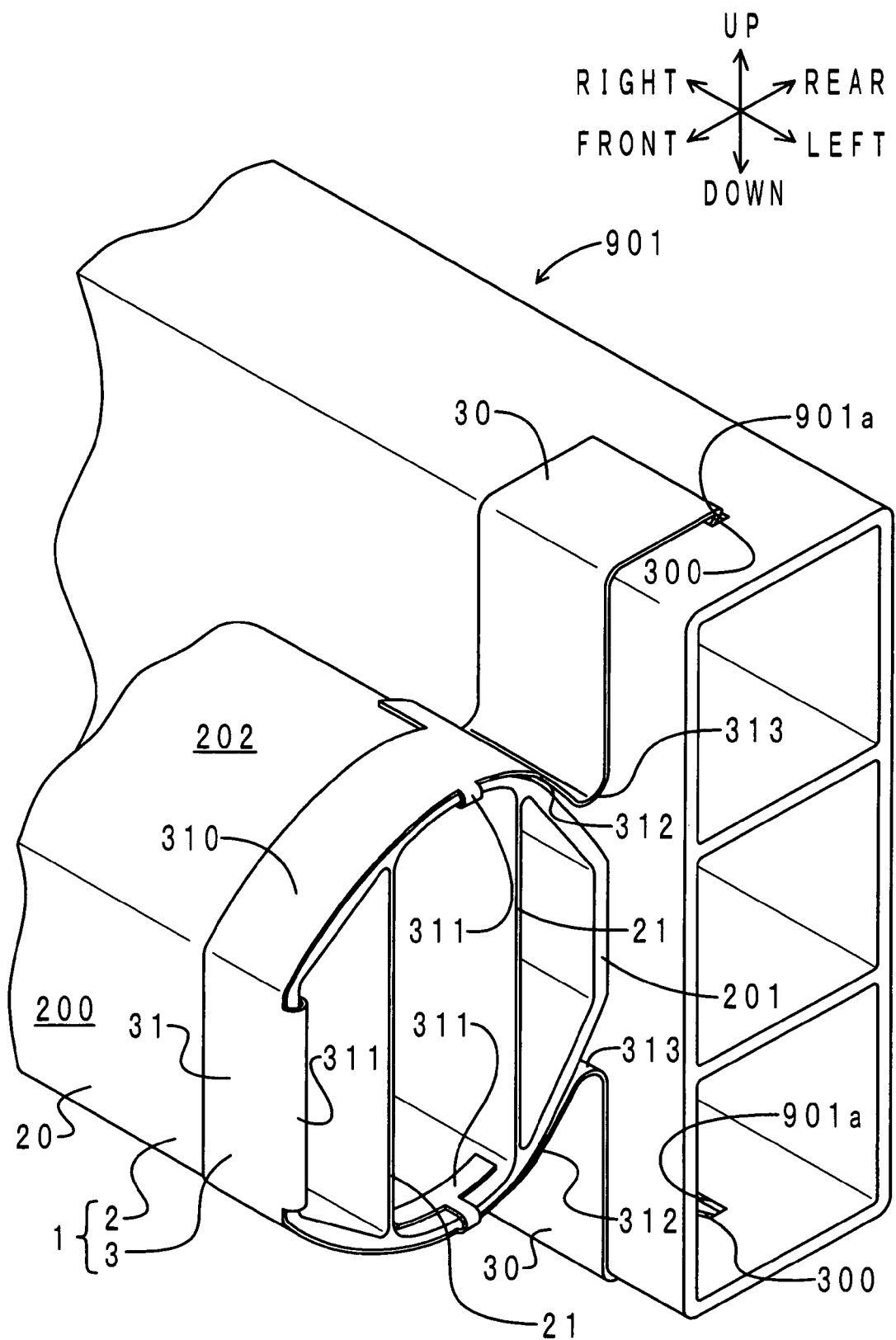
FIG. 10 is an enlarged perspective view of the vicinity of the left end portion of the impact absorbing member according to the fourth embodiment.

The impact absorbing member of this embodiment is different from the impact absorbing member of the first embodiment only in the shape of the pawl portion. Therefore, only different points will be described. FIG. 10 shows an enlarged perspective view of the vicinity of the left end portion of the impact absorbing member of this embodiment. Note that components corresponding to those in FIG. 2 are denoted by the same reference symbols.

As shown in FIG. 10, each of a pair of the pawl portions 311 which nip a pair of the connecting wall portions 202 has a T-shape having a branch terminal portions. The branch terminal portions nip a section surrounded by a pair of the inner ribs 21 of the connecting wall portions 202 together with the covering portion 310.

The impact absorbing member 1 of this embodiment has the same operation and effect as the impact absorbing member of the first embodiment in terms of the portions having a common structure. The impact absorbing member 1 of this embodiment has three pawl portions 311. Thus, the quantity of arrangements of the pawl portions 311 is smaller than the impact absorbing member of the first embodiment.

Other Examples

Embodiments of the impact absorbing member according to the present invention were described above. However, the embodiments are not necessarily limited to those described above, and the present invention may be implemented in various modified and improved aspects evident to a person skilled in the art.

For example, the configuration of the impact absorbing body 2 is not limited particularly. It may be of a polygon, such as a triangle, a rectangle, a pentagon, or a hexagon. Further, it may be of a perfect circle, an ellipse, or a semi-circle. The material of the impact absorbing body 2 is not limited particularly. It is permissible to use polyamide (PA), polycarbonate (PC), alloy of PC and polybutylene terephthalate (PBT), alloy of PC and polyethylene terephthalate (PET), polypropylene (PP), polyethylene (PE), acrylonitrile butadiene styrene (ABS) or the like. The forming method of the impact absorbing body 2 is not limited particularly. It is permissible to use an injection molding, blow molding and the like.

The shape of the mounting member 3 is not limited particularly. For example, easiness of deformation of the mounting member 3 at the time of a collision can be adjusted by adjusting the length in the right and left direction of the projecting portion 31 entirely or partially. That is, the load on the mounting member 3 can be adjusted. Likewise, the load on the mounting member 3 can be adjusted in the similar way by boring holes in the projecting portion 31 appropriately.

Further, the arrangement positions of the pawl portions 311 is not limited. The pawl portion 311 is disposed at a portion at which the mounting member 3 is separated easily from the impact absorbing body 2 when the impact absorbing body 2 is deformed. Further, the shape and the quantity of the pawl portions 311 are not limited.

Further, the material of the mounting member 3 is not limited particularly. Needless to say, the mounting member 3 may be made of resin as well as metal. The manufacturing method of the mounting member 3 is not limited particularly. It may be manufactured by forging, casting or injection molding. In the meantime, when the mounting member 3 is manufactured by pressing, preferably, the thickness of the mounting member 3 is less than 3 mm. The reason is that it is easy to process.

The arrangement place of the impact absorbing member 1 is not limited particularly. From viewpoints of protection of a passenger, the impact absorbing member 1 may be disposed on the back of a member exposed into the vehicle compartment. For example, it may be disposed on the back of a front pillar, center pillar, front door trim, rear door trim or instrument panel. Further, from viewpoints of protection of a pedestrian, the impact absorbing member 1 may be disposed on the back of a member against which a pedestrian likely collides. For example, it may be disposed on the back of a rear bumper, side molding or the like. The impact absorbing member may be disposed on the front side of these exposed members as well as on the back thereof.

Practical Examples

Hereinafter, a striker crash experiment performed about the impact absorbing member of the present invention will be described.
<Sample>
[Practical Example Sample]

Figure 11:
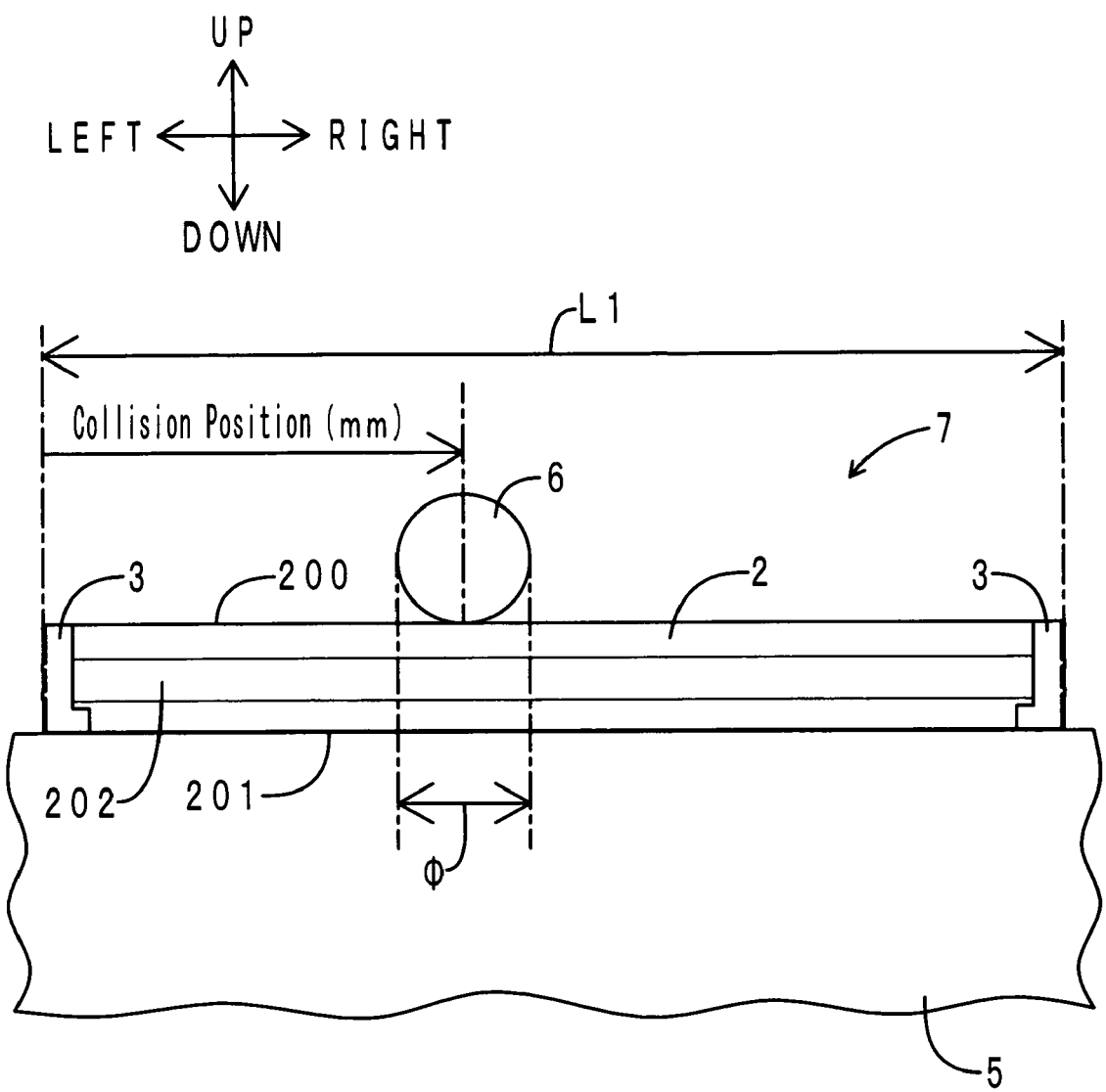
FIG. 11 is a front view of the practical example sample.

First, the practical example sample will be described. FIG. 11 shows a front view of the practical example sample. Note that components corresponding to those in FIG. 2 are denoted by the same reference symbols. As shown in FIG. 11, the practical example sample 7 and the impact absorbing member of the first embodiment are substantially identical except the configuration of the base portion of the mounting member 3. The practical example sample 7 includes the impact absorbing body 2 and the mounting member 3. A pair of the mounting members are disposed on both right and left end portions of the impact absorbing body 2. The mounting member 3 is installed on a mounting object member 5. The entire length in the right and left direction L1 of the practical example sample 7 is 600 mm.

Figure 12:
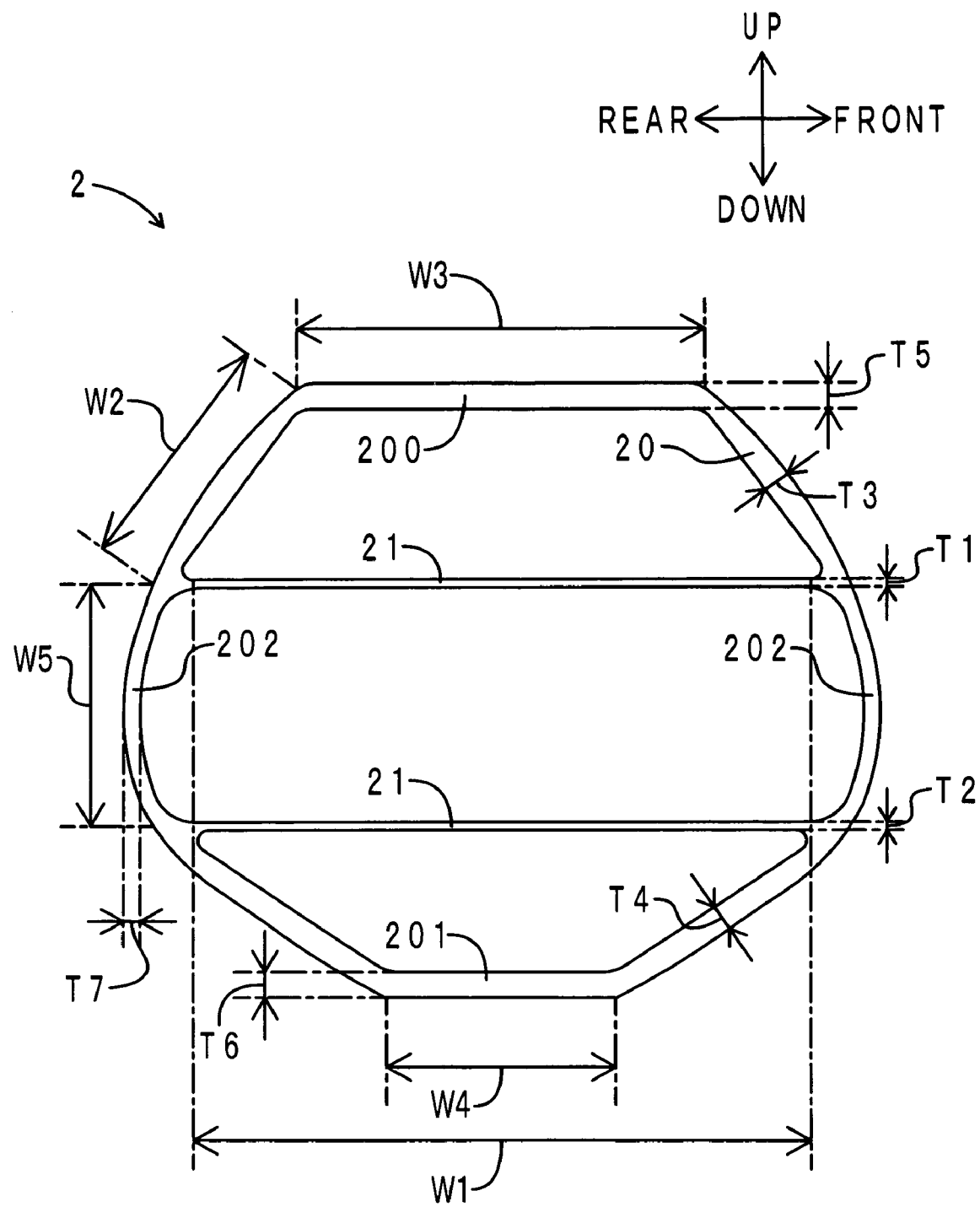
FIG. 12 is a left side view of the impact absorbing body.

Next, the impact absorbing body 2 will be described. FIG. 12 shows a left side view of the impact absorbing body 2. As shown in FIG. 12, the length W1 in the back and forth direction of a pair of the inner ribs 21 is 109 mm. The length W2 of a section between the input wall portion 200 and the upper inner rib 21 on the connecting wall portion 202 is 40 mm. The length W3 in the back and forth direction of the input wall portion 200 is 60 mm. The length W4 in the back and forth direction of the output wall portion 201 is 40 mm. The length W5 of an interval between the pair of the inner ribs 21, upper and lower in the connecting wall portion 202 is 40 mm.

The thickness T1 of the upper inner rib 21 is 0.5 mm. The thickness T2 of the lower inner rib 21 is 0.7 mm. Further, the thickness T3 of a section between the input wall portion 200 and the upper inner rib 21 on the connecting wall portion 202 is 3 mm. The thickness T4 of a section between the output wall portion 201 and the lower inner rib 21 on the connecting wall portion 202 is 3.5 mm. The thickness T5 of the input wall portion 200 is 3.5 mm. The thickness T6 of the output wall portion 201 is 4 mm. Further, the thickness T7 of a section between a pair of the upper and lower inner ribs 21 on the connecting wall portion 202 is 3 mm.

Figure 13:
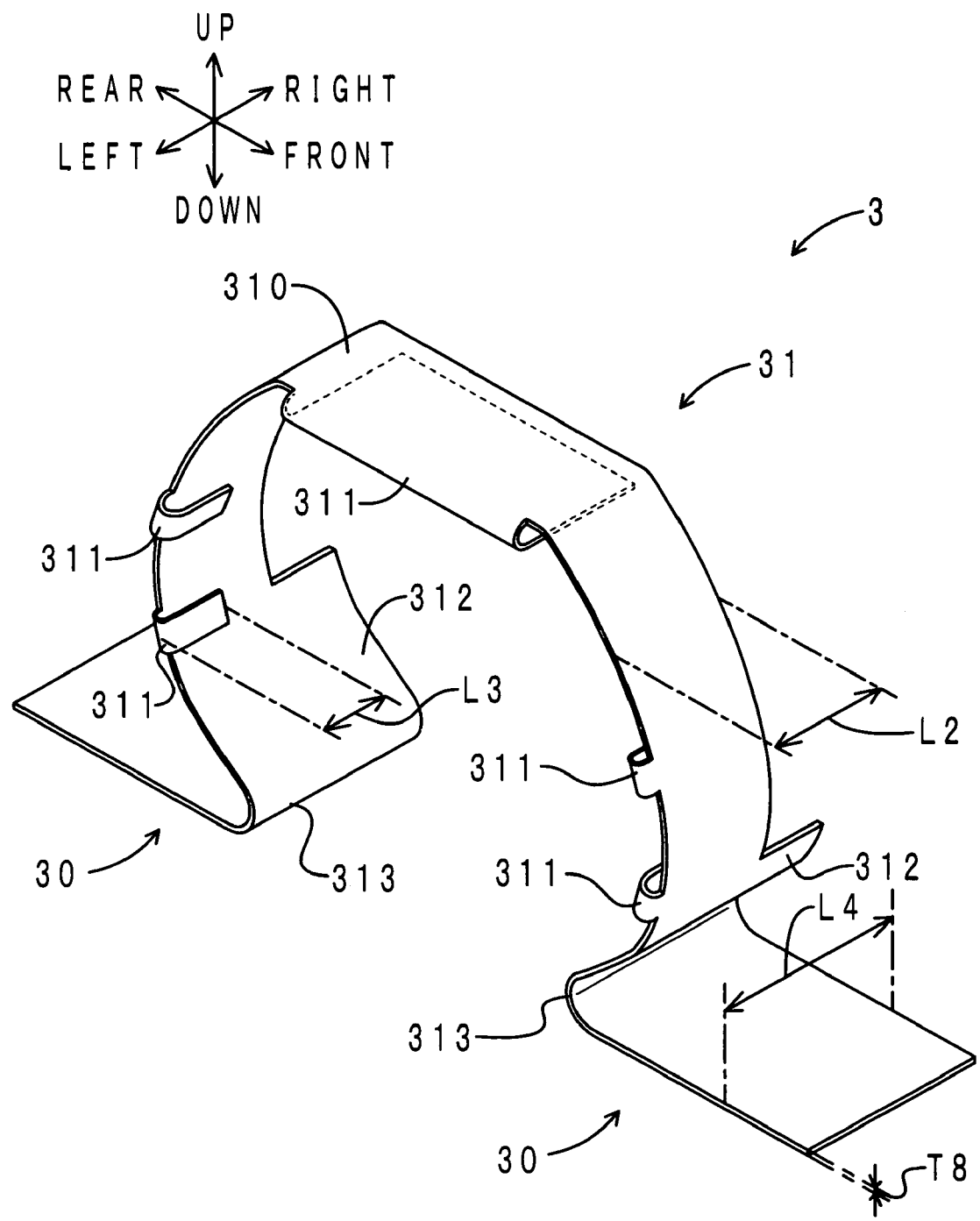
FIG. 13 is a perspective view of the mounting member.

Next, the mounting member 3 will be described. FIG. 13 shows a perspective view of the mounting member 3 disposed on the left end portion of the impact absorbing body 2. The pair of the left and right mounting members 3 have the same shape and dimensions. Therefore, only the mounting member 3 on the left side will be described and description of the mounting member 3 on the right side is omitted. As shown in FIG. 13, a total length L2 in the right and left direction of a section in which the pawl portion 311 is disposed, of the projecting portion 31 of the mounting member 3 is 25 mm. A total length L3 in the right and left direction of each of the four pawl portion 311 for the connecting wall portion 202 (see FIG. 11) of the five pawl portions 311 is 10 mm. A total length L4 in the right and left direction of the base portion 30, the chamfered portion 313 and the wrap-around portion 312 of the mounting member 3 is 45 mm. The thickness T8 of a steel plate constituting the mounting member 3 is 1 mm.

[Comparative Example Sample]

Next, the comparative example sample will be described. The comparative example sample is the practical example sample 7 from which the pair of the mounting members 3 are removed. That is, only the impact absorbing body 2 of the practical example sample 7 was used as the comparative sample.

Experimental Method

As shown in FIG. 11, the striker 6 is a rigid body, which is a cylinder 100 mm in diameter and 1 m in length. The mass of the striker 6 is 26.5 kg. The practical example sample 7 and the comparative example sample were hit against the striker 6 such that the length direction of the striker 6 and the length direction of the sample (practical example sample 7 and the comparative example sample) were perpendicular to each other. The crash speed of the striker 6 was set to 16 km/h.

Figure 14A:
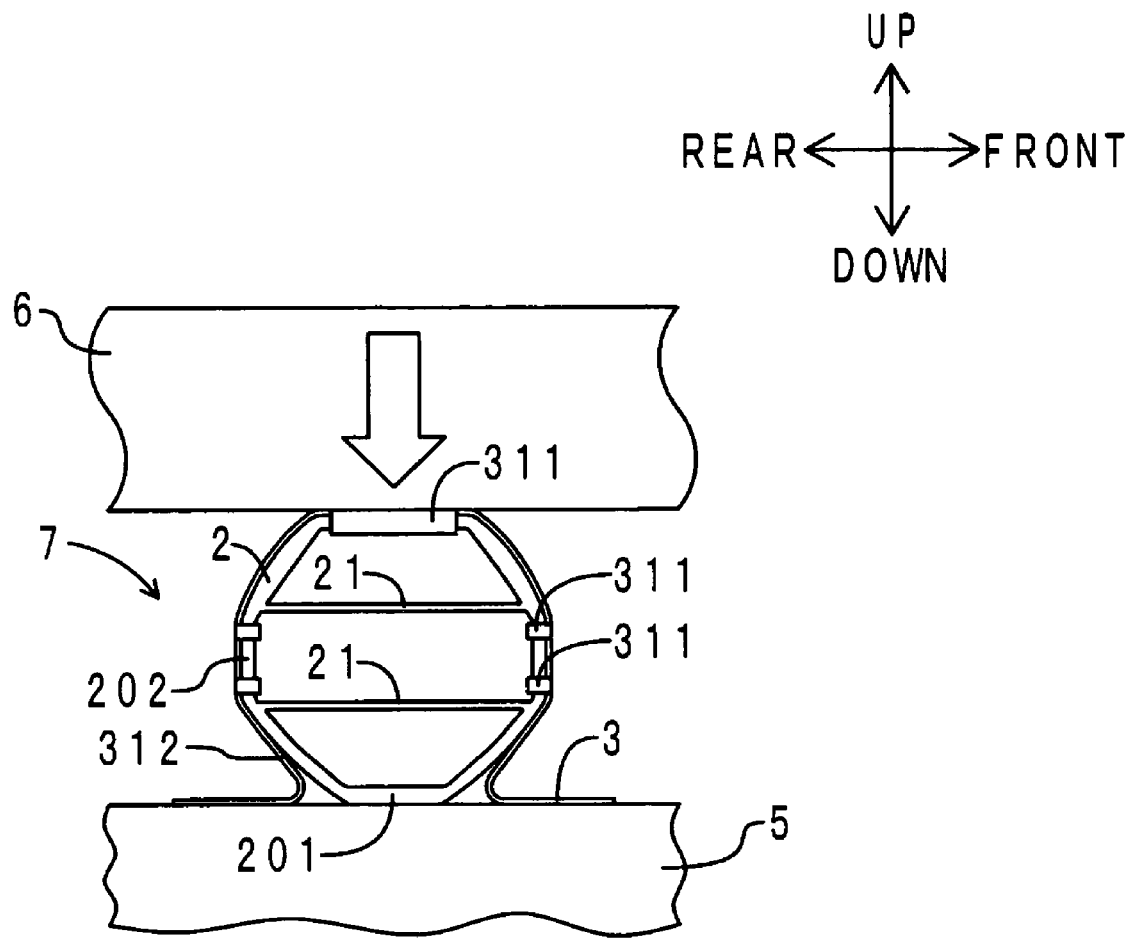
FIG. 14A is a schematic diagram showing a condition of impact initial period when the mounting member of the practical example sample is hit against a striker.
Figure 14C:
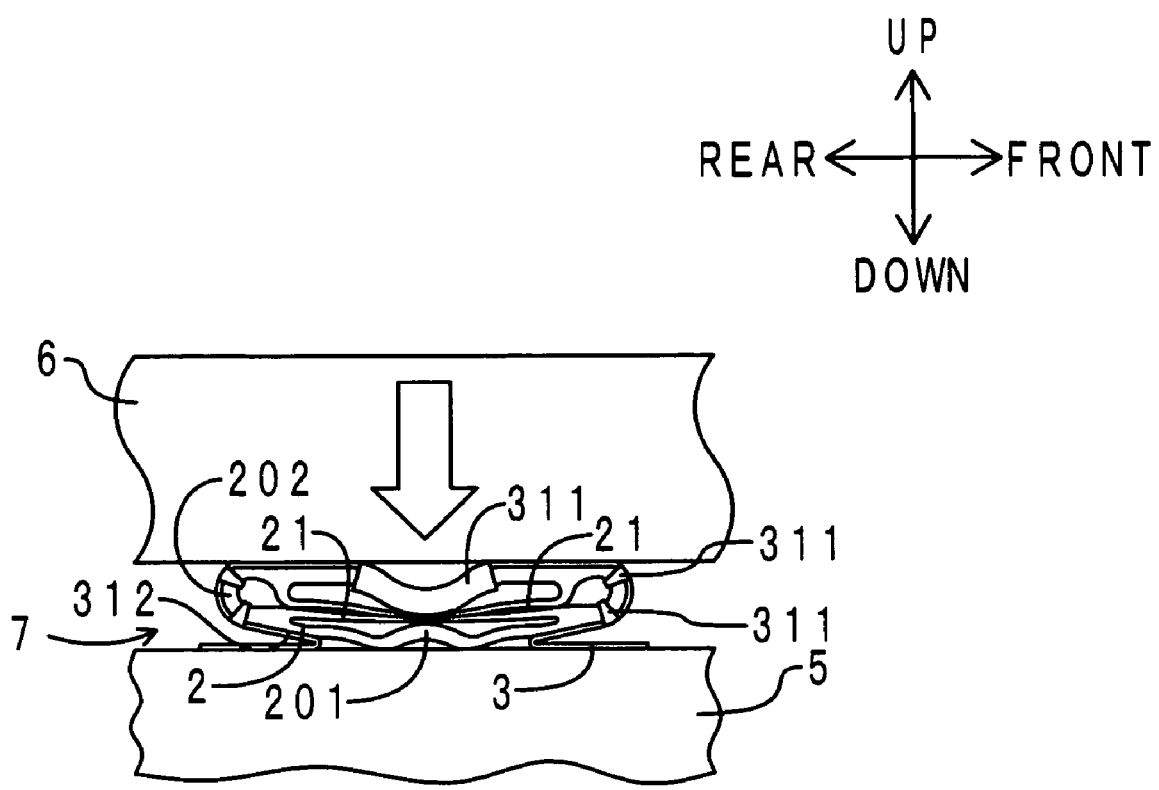
FIG. 14C is a schematic diagram showing a condition of collision termination period when the mounting member of the practical example sample is hit against a striker.

FIG. 14A shows a condition of collision initial period when the mounting member 3 of the practical example sample 7 was hit against the striker 6. FIG. 14B shows a condition of collision intermediate period when the mounting member 3 of the practical example sample was hit against the striker 6. FIG. 14C shows a condition of collision termination period when the mounting member 3 of the practical example sample 7 was hit against the striker 6. As shown in FIG. 14A through FIG. 14C, the practical example sample 7 was crushed between the striker 6 located above and the mounting object member 5 located below. The inner ribs 21 of the impact absorbing body 2 were deformed by tension in the back and forth direction by a load at the time of collision.

The mounting member 3 and the impact absorbing body 2 are fixed firmly by means of the five pawl portions 311. Thus, the mounting member 3 is not separated from the impact absorbing body 2 easily. That is, the mounting member 3 is deformed along deformation of the impact absorbing body 2. More specifically, the apex wall of the mounting member 3 is sunk and deformed downwardly at the same time when the input wall portion of the impact absorbing body 2 is sunk and deformed downwardly. Further, the pair of the side walls of the mounting member 3 are expanded and deformed when the pair of the connecting wall portions 202 of the impact absorbing body 2 are expanded and deformed in the back and forth direction.

The wrap-around portion 312 of the mounting member 3 covers a portion exposed on the mounting object member 5 side (that is, bottom side portion) on the left end portion and the right end portion of the impact absorbing body 2. Thus, the wrap-around portion 312 is sandwiched between the left end portion or the right end portion and the mounting object member 5 by a load at the time of a collision. That is, the wrap-around portion 312 is deformed following up deformation of the portion exposed on the mounting object member 5 side on the left end portion or the right end portion of the impact absorbing body 2.

<Result of Experiment>

Figure 15:
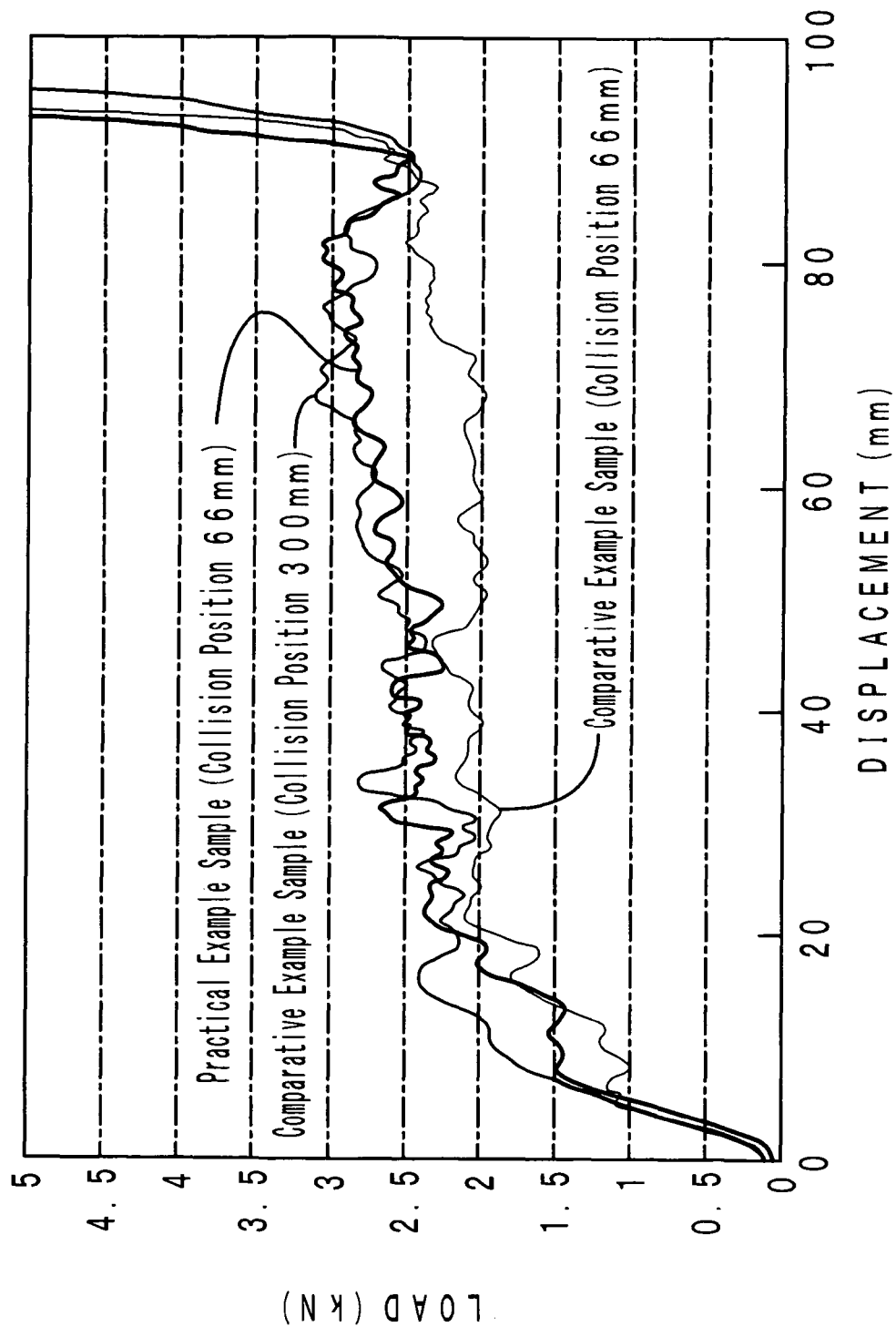
FIG. 15 is a graph showing the relation between displacement and load at a predetermined collision position of the samples of the practical example and comparative example.

FIG. 15 shows the relation between displacement and load at a predetermined collision position (see FIG. 11) of the practical example sample 7 and the comparative example sample. The displacement mentioned here refers to a displacement in the downward direction of a collision position when the striker 6 collides. The load mentioned here refers to a load (reaction force which the striker 6 receives from the collision position) applied to the collision position when the striker 6 collides.

As shown in FIG. 15, in case of the comparative example sample, it is evident that the load is decreased when the collision position is 66 mm with respect to the collision position of 300 mm (center in the right and left direction), that is, when the collision position is close to the left end portion of the impact absorbing body 2. Contrary to this, in case of the practical example sample 7, it is evident that the load is not decreased easily when the collision position is 66 mm, with respect to the collision position of 300 mm of the comparative example sample.

FIG. 16 shows the relation between the collision position and energy amount of the practical example sample 7 and the comparative example sample. As shown in FIG. 16, it is evident that amount of the absorbed energy of the practical example sample and the comparative example sample are equal in a section from 150 mm to 300 mm (center in the right and left direction) in the collision position. Contrary to this, it is evident that the amount of the absorbed energy is larger in the practical example sample 7 than in the comparative example sample in the section from 66 mm to 150 mm in the collision position, that is, when the collision position is close to the left end portion of the impact absorbing body 2. Further it is evident that in the case of the practical example sample 7, the amount of the absorbed energy is substantially constant in a section from the center in the right and left direction to the left end portion. More specifically, if it is assumed that the energy amount of the collision position 300 mm is 100%, the energy amount of the collision position 66 mm is 97%. Therefore, in the case of the practical example sample 7, even if any position of the impact absorbing body 2 is hit against the striker 6, substantially uniform impact absorption property can be secured.

What is claimed is:

1. An impact absorbing member comprising:
a long impact absorbing body for absorbing energy at the time of a collision by being deformed itself; and
a first mounting member and a second mounting member which are disposed on reinforcement object portions of the impact absorbing body so as to be deformed along deformation of the reinforcement object portions at the time of a collision, and which are mounted to a mounting object member, wherein,
the reinforcement object portions are both end portions in the length direction of the impact absorbing body,
the first mounting member is disposed on one end portion in the length direction of the impact absorbing body, and the second mounting member is disposed on the other end portion in the length direction of the impact absorbing body,
the impact absorbing body includes an outer cylinder and a pair of inner ribs whose faces are developed substantially perpendicular to the direction of a load input at the time of a collision while connecting the inner faces of the outer cylinder,
the outer cylinder includes an input wall portion to which a load is inputted, an output wall portion which outputs the load to the mounting object member while being disposed substantially in parallel to the input wall portion, and a pair of connecting wall portions for connecting the input wall portion with the output wall portion,
the pair of the inner ribs are disposed substantially in parallel to the input wall portion and the output wall portion while the pair of the inner ribs connect the inner faces of the pair of the connecting wall portions,
each of the first and second mounting members includes a covering portion which covers from outside the corresponding one of the end portions in the length direction of the impact absorbing body, and a plurality of pawl portions each of which is curved inward and extended from the covering portion,
the covering portion covers from outside the outer cylinder such that the inner face of the covering portion runs along the outer periphery of the outer cylinder,
at each of both end portions in the length direction of the outer cylinder, at least both end portions in the circumferential direction of the input wall portion and both end portions in the circumferential direction of a section surrounded by the pair of the inner ribs of the connecting wall portion are nipped between the covering portion and the pawl portions, and
the pair of inner ribs of the impact absorbing body is deformed by tension at the time of a collision, and each of the first and second mounting members is deformed following up deformation of the impact absorbing body.

2. The impact absorbing member according to claim 1, wherein each of the first and second mounting members has a wrap-around portion which covers at least part of a portion exposed on the mounting object member side of the reinforcement object portion.

3. The impact absorbing member according to claim 1, wherein each of the first and second mounting members independently overlaps the corresponding end portions in the length direction of the impact absorbing body as viewed from the direction of a load input at the time of a collision.

4. The impact absorbing member according to claim 1, wherein the impact absorbing body is made of resin.

* * * * *